(12) United States Patent
Kawashima et al.

(10) Patent No.: US 6,438,084 B2
(45) Date of Patent: Aug. 20, 2002

(54) DATA RECORDING APPARATUS AND METHOD, DATA PLAYBACK APPARATUS AND METHOD, AND OPTICAL DISC

(75) Inventors: Tetsuji Kawashima; Yukio Shishido, both of Kanagawa; Yoichiro Sako, Tokyo; Tatsuya Inokuchi, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/816,943

(22) Filed: Mar. 23, 2001

(30) Foreign Application Priority Data

Mar. 24, 2000 (JP) ........................................ 2000-088601

(51) Int. Cl.⁷ ................................................ G11B 7/00
(52) U.S. Cl. ................................. 369/53.22; 369/275.3
(58) Field of Search .............................. 369/53.22, 83, 369/47.13, 47.16, 84

(56) References Cited

U.S. PATENT DOCUMENTS 5,995,471 A  * 11/1999  Saoyama et al. ............. 369/83

* cited by examiner

Primary Examiner—Nabil Hindi
(74) Attorney, Agent, or Firm—Jay H. Maioli

(57) ABSTRACT

When writing data to a normal-density CD-R, data linking blocks including two run-out blocks are appended to each packet of the data, and the data is interleaved with a maximum delay of 108 frames. On the other hand, when writing data to a double-density CD-R, data linking blocks including three run-out blocks are appended to each packet of the data, and the data is interleaved with a maximum delay of 189 frames. There are provided a data recorder, data recording method, data player, data playback method, and an optical disc with which data can properly be written to or read from an optical disc having an increased recording density, and which can support an optical disc having the current format.

33 Claims, 19 Drawing Sheets

FIG.8

「Block Indicator」
- = 「000」 : USE DATA BLOCK
- = 「001」 : THIRD RUN-IN BLOCK
- = 「010」 : SECOND RUN-IN BLOCK
- = 「011」 : FIRST RUN-IN BLOCK
- = 「100」 : LINK BLOCK
- = 「101」 : THIRD RUN-OUT BLOCK
- = 「110」 : SECOND RUN-OUT BLOCK
- = 「111」 : FIRST RUN-OUT BLOCK

DATA RECORDING APPARATUS AND METHOD, DATA PLAYBACK APPARATUS AND METHOD, AND OPTICAL DISC

BACKGROUND OF THE INVENTION

1. Field of the Invention

The present invention relates to a data recording apparatus and method for writing data to an optical disc, data playback apparatus and method for reading data from an optical disc, and an optical disc.

2. Description of the Related Art

There has become popular a CD (compact disc) system in which an optical disc having an outside diameter of about 120 mm and a thickness of about 1.2 mm is used as a recording medium and a signal is read from, or written to, the optical disc by projecting a light converged by an objective lens onto a signal recording surface of the optical disc.

The CD system has initially been developed as a recording and playback system for digital audio data. As this technology has been accepted very widely, a wide variety of CD systems have so far been proposed for various applications.

Recently, the personal computers have been used as an information processing means in more and more ordinary households. Along with this tendency, a read-only optical disc called "CD-ROM (read-only memory)" has become popular to have recorded therein data handled in the personal computer.

Also, a recordable optical disc such as CD-R (recordable) and rewritable optical disc such as CD-RW (rewritable) have been developed and used in practice as optical discs interchangeable with the CD-ROM.

Data is recorded to the CD-R and CD-RW by the so-called "Track At Once" method by which data is written in units of a track, and the so-called "Packet Writing" method by which data is written in units of a packet which is a smaller unit than the track. When either the "Track At Once" or "Packet Writing" method is used to record data to the CD-R or CD-RW, a plurality of data linking blocks is provided between tracks or between packets, each being a unit in which data is continuously recorded, according to a predetermined linking rule. That is, in case data is recorded by the "Track At Once" method or "Packet Writing" method, it will be written with a plurality of data linking blocks appended to each unit of data which is to be continuously written.

The reason why the plurality of data linking blocks is appended between tracks or packets is that the CD-R and CD-RW adopt a convolution type cross coding method called "CIRC (cross interleaved Reed-Solomon code)" and a data discontinuity takes place at a linking position because of the CIRC interleaving. That is, the data linking blocks are provided at a linking position of data as a guard area in which data missing is prevented in linking interleaved data to each other.

The amount of data handled in the personal computer has increased more and more, and thus the CD-ROM, CD-R and CD-RW as recording media for recording data have strongly been required to have an increased storage capacity.

To meet such a requirement, the so-called double-density CD-R and CD-RW maintaining the CD format and having a recording density about 2 times higher than the current CD format are under development.

In the double-density CD-R and CD-RW, the EFM modulation and demodulation methods and wobble signal frequency applied to the CD-R and CD-RW having the current format (will be referred to as "normal-density CD-R" and "normal-density CD-RW", respectively, hereunder) are not changed but the track pitch is decreased while the linear density is increased, to whereby elevate the recording density up to about double that of the normal-density CD-R and CD-RW.

In the double-density CD-R and CD-RW whose recording density is increased by reducing the track pitch while increasing the linear density, a defect such as scratch to a recording mark will be larger than that in the normal-density CD-R and CD-RW. That is, in the double-density CD-R and CD-RW, the burst error length will be larger than in the normal-density CD-R and CD-RW.

Therefore, the double-density CD-R and CD-RW will be more susceptible to a burst error than the normal-density CD-R and CD-RW. So, proper the CIRC error correcting method used in the current normal-density CD-R and CD-RW is adopted as it is in the double-density CD-R and CD-RW, an error cannot be corrected in some cases, which will highly possibly lead to an improper reading of data.

To positively correct the burst error, it is effective to increase the interleaving length by setting a large delay parameter indicative of a CIRC unit delay. However, with an increased interleaving length, the linking rule adopted in the current normal-density CD-R and CD-RW is not capable of accurately linking data. Therefore, to write data to the double-density CD-R and CD-RW, it is necessary to adopt a suitable linking rule for the double-density CD-R and CD-RW.

Also, the optical disc drive for such a double-density CD-R or CD-RW has to be able to properly write and read data to and from a double-density CD-R or CD-RW and to the normal-density CD-R or CD-RW as well. Namely, the optical disc drive for the double-density CD-R and CD-RW is required to be able to support also the normal-density CD-R and CD-RW, that is, they have to be compatible with the latter also.

OBJECT AND SUMMARY OF THE INVENTION

It is therefore an object of the present invention to overcome the above-mentioned drawbacks of the prior art by providing a data recording apparatus and method in which a linking rule suitable for use with an optical disc having a high recording density is used to link data, thereby permitting to realize a proper data recording to the optical disc, a data playback apparatus and method which can read an optical disc having data recorded therein according the above-mentioned linking rule, the data recording and playback apparatuses and methods being able to support an optical disc having a current format as well, and an optical disc having recorded therein a program of the above data recording and playback.

The above object can be attained by providing a data recording apparatus for recording data to a conventional standardized optical disc as well as to an optical disc having a higher recording density than the former optical disc, the apparatus including according to the present invention:

means for appending a plurality of data linking blocks to each unit of data going to be continuously written to the optical disc;

means for error-correction coding, including interleaving, of the data in the data unit having the data linking blocks appended thereto by the data linking block appending means;

means for continuously writing the data having been subjected to the error-correction coding by the data-correction coding means to the optical disc at each unit of data having the plurality of data linking bocks appended thereto by the data linking block appending means; and an optical disc discriminator for judging to which the data is going to be written by the data writing means, the conventional standardized optical disc or the optical disc having a higher recording density than the former optical disc.

In the above data recording apparatus according to the present invention, when the optical disc discriminator has judged that data is going to be written by the data writing means to the conventional standardized optical disc, the data linking block appending means appends a plurality of data linking blocks, including two run-out blocks, to each unit of data going to be continuously written to the optical disc, and the error-correction coding means interleaves the data with a unit delay of four frames. When the optical disc discriminator has judged that the data is going to be written by the data writing means to the optical disc having the higher recording density than the conventional standardized optical disc, the data linking block appending means appends a plurality of data linking blocks, including three run-out blocks, to each unit of data going to be continuously written to the optical disc, and the error-correction coding means interleaves the data with a unit delay of seven frames.

In the above data recording apparatus, when the optical disc discriminator has judged that the data is going to be written to the conventional standardized optical disc, the data linking block appending means appends a plurality of data linking blocks, including two run-out blocks, to each unit of data going to be continuously to be written to the optical disc. Then, the error-correction coding means interleaves the data having the data linking blocks appended thereto with a unit delay of four frames. Further, the data interleaved with the unit delay of four frames is written by the data writing means to the conventional standardized optical disc.

Also, in the data recording apparatus, when the optical disc discriminator has judged that the data is going to be written to the optical disc having the higher recording density than the conventional standardized optical disc, the data linking block appending means appends a plurality of data linking blocks, including three run-out blocks, to each unit of data going to be continuously to be written to the optical disc. Then, the error correction coding means interleaves the data having the data linking blocks appended thereto with a unit delay of seven frames. Further, the data interleaved with the unit delay of seven frames is written by the data writing means to the conventional standardized optical disc.

As in the above, in the data recording apparatus, since data linking block appending and error-correction coding are effected in one or other manner, depending upon the recording density of an optical disc to which data is going to be written, data can properly be linked even in the optical disc having the high recording density while preventing the ability of correcting a burst error from being lower, and the error correction and data linking can properly be done in the conventional optical disc as well.

Also the above object can be attained by providing a data recording method for recording data to a conventional standardized optical disc as well as to an optical disc having a higher recording density than the former optical disc, the method including according to the present invention:

a first step at which it is judged to which the data is going to be written, the conventional standardized optical disc or the optical disc having a higher recording density than the former optical disc;

a second step at which a plurality of data linking blocks is appended to each unit of data going to be continuously written to the optical disc;

a third step at which error-correction coding, including interleaving, is made of the data having the data linking blocks appended thereto; and a fourth step at which the data having been subjected to the error-correction coding at the third step is continuously written to the optical disc at each unit of data having the plurality of data linking bocks appended thereto at the second step.

In the above data recording method according to the present invention, when it has been judged at the first step that data is going to be written to the conventional standardized optical disc, a plurality of data linking blocks, including two run-out blocks, is appended at the second step to each unit of data going to be continuously written to the optical disc, and the data is interleaved with a unit delay of four frames at the third step. When it has been judged at the first step that data is going to be written to the optical disc having the higher recording density than the conventional standardized optical disc, a plurality of data linking blocks, including three run-out blocks, is appended at the second step to each unit of data going to be continuously written to the optical disc, and the data is interleaved with a unit delay of seven frames at the third step.

In the above data recording method, since data linking block appending and error-correction coding can properly be effected correspondingly to the recording density of an optical disc to which the data is going to be written, data can properly be linked even in the optical disc having the higher recording density while preventing the ability of correcting a burst error from being lower, and the error correction and data linking can properly be done in the conventional optical disc as well.

Also, the above object can be attained by providing a data playback apparatus for reading data from a first optical disc defined under a first standard as well as from a second optical disc defined under a second standard, the apparatus including according to the present invention:

an optical head which emits a laser light to the optical disc and detects a reflected light from the optical disc;

an optical disc discriminator for judging from which the data has been read by the optical head, the first optical disc or second optical disc;

means for error correction, including de-interleaving, of the data having been read by the optical head; and means which is supplied with the data whose error has been corrected by the error correcting means and removes a plurality of data linking blocks having been appended, for data linking, to each unit of the data having continuously been written to the first and second optical disc.

In the above data playback apparatus, when the optical disc discriminator has judged that the data has been read by the optical head from the first optical disc, the data linking block removing means removes the plurality of data linking blocks, including two run-out blocks, from each unit of data having continuously been written to the optical disc. When the optical disc discriminator has judged that data has been read from the second optical disc, the data linking block removing means removes the plurality of data linking blocks, including three run-out blocks, from each unit of data having continuously been written to the optical disc.

Also in the data playback apparatus, when the optical disc discriminator has judged that data has been read by the optical head from the first optical disc, the error correcting means interleaves the data having been read by the optical head with a first unit delay.

When the optical disc discriminator has judged that the data has been read by the optical head from the second optical disc, the error correcting means interleaves the data having been read by the optical head with a second unit delay larger than the first unit delay.

In the above data playback method, since data linking block appending and error-correction coding are effected in one or other manner, depending upon the recording density of an optical disc from which data is going to be read so that such processes can properly be effected correspondingly to the recording density of an optical disc from which the data is going to be read, the data can properly be read from the optical disc having the higher recording density while preventing the ability of correcting a burst error from being lower, and the data can properly be read from the conventional optical disc as well.

Also the above object can be attained by providing a data playback method for reading data from a first optical disc defined under a first standard as well as from a second optical disc defined under a second standard, the method including according to the present invention:

a first step at which a light beam is emitted to the optical disc and a return light from the optical disc is detected;

a second step at which it is judged to which the light beam has been emitted, the first optical disc or second optical disc;

a third step at which error correction, including de-interleaving, is made of the data having been read from the optical disc; and a fourth step at which there is removed a plurality of data linking blocks having been appended, for data linking, at each unit of the data whose error has been corrected at the third step and which have continuously been written to the optical disc.

In the above data playback method, when it has been judged at the second step that the data is going to be read from the first optical disc, the data is interleaved with a first unit delay at the third step.

When it has been judged at the second step that the data is going to be read from the second optical disc, the data is de-interleaved at the third step with a second unit delay larger than the first unit delay.

In the above data playback method, since the data linking block appending and error correction can properly be effected correspondingly to the recording density of an optical disc from which the data has been read, the data can properly be read from the second optical disc having the high recording density while preventing the ability of correcting a burst error c from being lower, and the data can properly be read from the first optical disc as well.

Also the above object can be attained by providing an optical disc having data recorded therein by method for recording data to a conventional standardized optical disc or to an optical disc having a higher recording density, the method including according to the present invention:

a first step at which it is judged to which the data is going to be written, the conventional standardized optical disc or the optical disc having a higher recording density than the former optical disc;

a second step at which a plurality of data linking blocks is appended to each unit of data going to be continuously written to the optical disc;

a third step at which error-correction coding, including interleaving, is made of each unit of data having the data linking blocks appended thereto; and a fourth step at which the data having been subjected to the error-correction coding at the third step is continuously written to the optical disc at each unit of data having the plurality of data linking bocks appended thereto at the second step; and when it having been judged at the first step that data is going to be written to the conventional standardized optical disc, a plurality of data linking blocks, including two run-out blocks, being appended at the second step to each unit of data going to be continuously written to the optical disc and the data having the data linking blocks appended thereto is interleaved with a unit delay of four frames at the third step.

In the above optical disc, when it has been judged at the first step that data is going to be written to the optical disc having the higher recording density than the conventional standardized optical disc, a plurality of data linking blocks, including three run-out blocks, is appended, at the second step, to each unit of the data going to be continuously written to the optical disc and the data having the data linking blocks appended thereto is interleaved with a unit delay of seven frames at the third step.

Also in this optical disc, since the data linking block appending and error-correction coding processes are properly effected correspondingly to the recording density of the optical disc to which data is going to be written, data can properly be written to, and read from, even the optical disc having the high recording density while preventing the ability of correcting a burst error from being lower, and the data can properly be written to, and read from, the conventional standardized optical disc as well.

Also, in the above optical disc according to the present invention, a plurality of data linking blocks, including three run-out blocks, is appended to each unit of data going to be continuously written to the optical disc, the data having the data linking blocks thus appended thereto is subjected to error-correction coding including interleaving with a unit delay of seven frames, and the data having thus been subjected to the error-correction coding is continuously recorded to the optical disc at each unit of data block having the plurality of data linking blocks appended thereto.

In the above optical disc, since the data linking block appending and error-correction cording processes are properly effected correspondingly to the recording density of an optical disc to which data is going to be written, the data can properly be written to, and read from, the optical disc having the higher recording density, as well, while preventing the ability of correcting a burst error from being lower.

These objects and other objects, features and advantages of the present intention will become more apparent from the following detailed description of the preferred embodiments of the present invention of an optical disc drive which writes and/or reads data to and/or from a CD-R (recordable optical disc) when taken in conjunction with the accompanying drawings.

BRIEF DESCRIPTION OF THE DRAWINGS

FIG. 3 shows an example of the data structure in the CD-R in FIG. 1, in which FIG. 3A shows the recording area of the CD-R, including a plurality of sessions, FIG. 3B shows one session including a plurality of tracks, FIG. 3C shows one track including a plurality of packets, and FIG. 3D shows one packet including a plurality of data blocks;

FIG. 8 shows a data structure of subcode;

FIG. 24 shows a concrete example of the pattern of a sync signal SYNC for ATIP information written to a CD-R having a normal recording density, in which FIG. 24D; and FIG. 25 shows a concrete example of the pattern of a sync signal SYNC for ATIP information written to a CD-R having a recording density two times higher than the normal recording density, in which

DETAILED DESCRIPTION OF THE PREFERRED EMBODIMENTS

Figure 1:
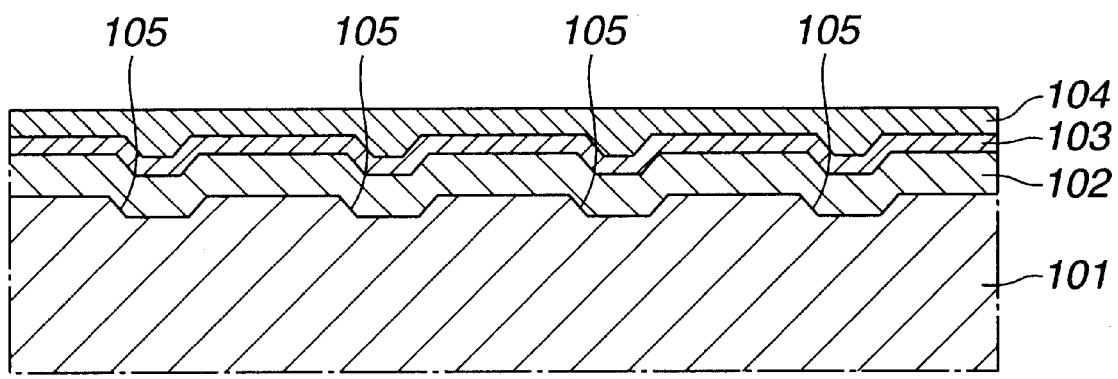
FIG. 1 is a sectional view of the essential portions of a CD-R.

Referring now to FIG. 1, there is schematically illustrated in the form of a sectional view a CD-R to and/or from which data is written and/or read by the optical disc drive according to the present invention.

As shown in FIG. 1, the CD-R includes a disc substrate 101 being a disc of polymethyl methacrylate (PMMA) or polycarbonate (PC), formed to have an outside diameter of 120 mm and thickness of 1.2 mm. The disc substrate 101 has a recording layer 102 formed thereon by spin coating of an organic-dye recording material. The recording layer 102 has formed thereon a reflective layer 103 of gold (Au) or silver (Ag) for example, and the reflective layer 103 has a protective layer 104 formed thereon by spin coating of an ultraviolet-settable resin for example.

In this CD-R, when the recording layer 102 is illuminated with a writing laser light modulated according to data to be written (recording data), an interaction between the recording layer 102 and the disc substrate 102 adjacent to the recording layer 102, within a laser light-illuminated area, will cause a deformation at the boundary between the disc substrate 101 and recording layer 102, whereby a train of pits corresponding to the recording data is irreversibly formed. By illuminating the pit train with a reading laser light and detecting a change of its reflectance, data written to the CD-R can be read.

Figure 2:
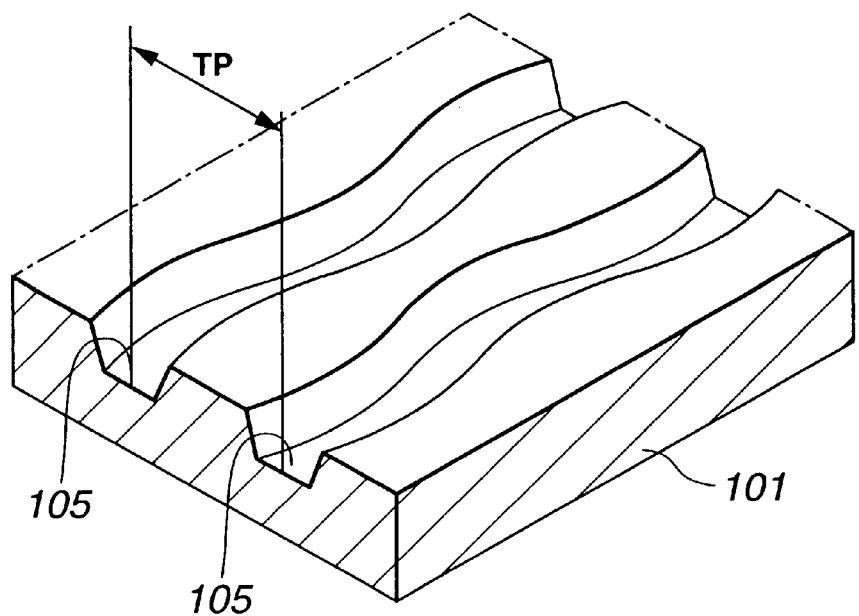
FIG. 2 is a perspective view, enlarged in scale, of a part of a disc substrate of the CD-R in FIG. 1.

As shown in FIGS. 1 and 2, wobbling grooves 105 being wobbling guide grooves are formed spiral for example in a data recording area of the disc substrate 101. Portions of the recording layer 102 corresponding to the wobbling grooves 105 are set as recording tracks along which user data etc. subjected to error-correction coding and EFM modulation will be recorded. Therefore, the interval between the adjacent wobbling grooves 105 is taken as a track pitch TP in this CD-R as shown in FIG. 2.

The wobbling grooves 105 are formed to wobble slightly resembling a sinusoidal wave. Owing to this wobbling, FM modulated positional information, that is, time bas information indicative of an absolute position on the disc, is recorded as an ATIP (absolute time in pregroove) wobble signal.

The ATIP wobble signal is recorded to have a center frequency of 22.05 kHz for example when the CD-R is rotated at a predetermined velocity. One sector of the ATIP wobble signal coincides with one data sector (2352 bytes) of user data, and thus the user data is written to the CD-R while the data sector of the user data is being brought into sync with the sector of the ATIP wobble signal.

Next, a recording format of the CD-R will be described herebelow. A data structure of the CD-R is shown in FIGS. 3A to 3D. The data structure shown in FIGS. 3A to 3D is an example in which data is written in units of a packet to the CD-R by the so-called "Packet Writing" method.

Figure 3:
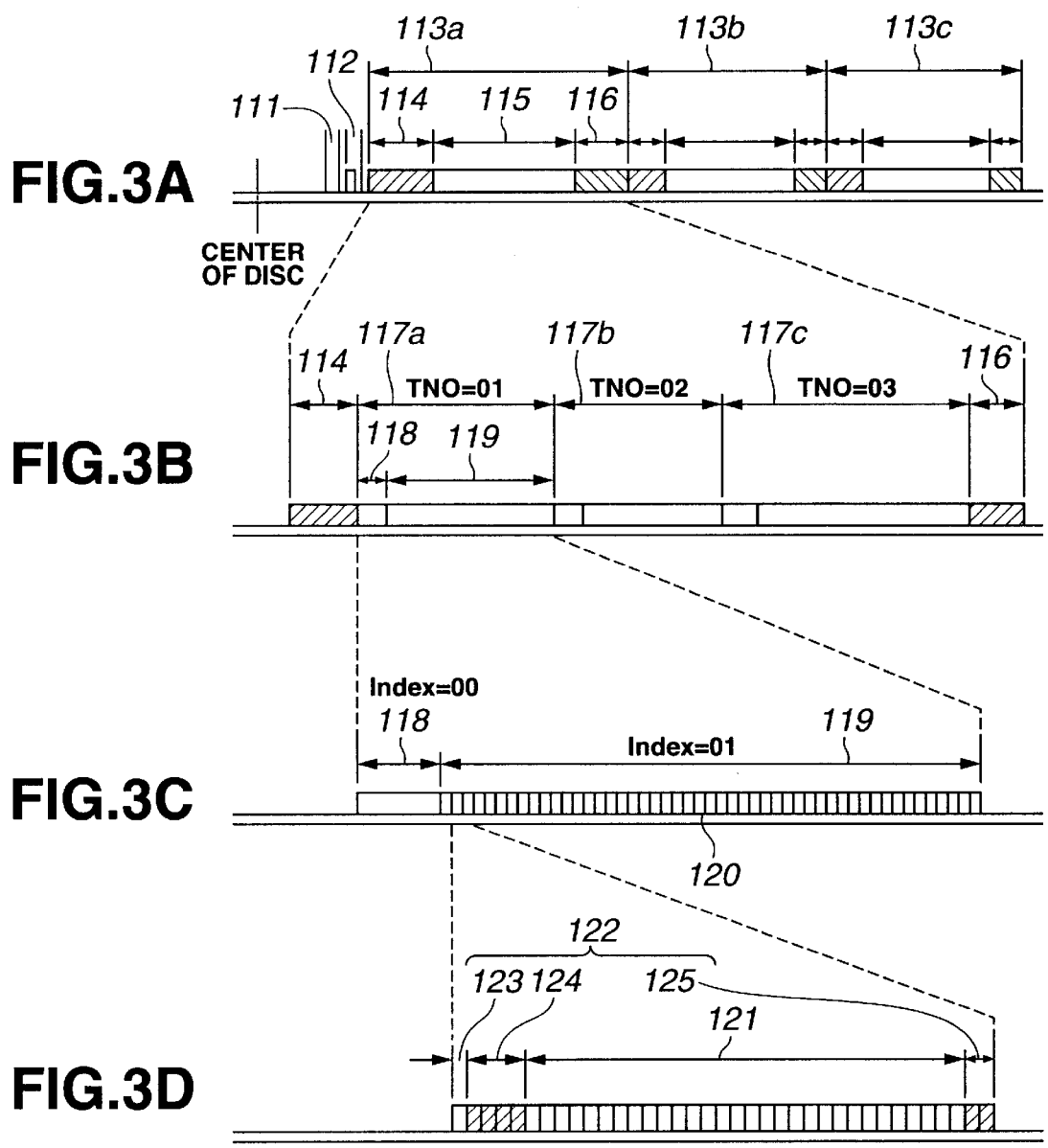

As will be seen from FIG. 3A, the data recording area of the CD-R includes a power calibration area (PCA) 111, program memory area (PMA) 112 and a plurality of sessions 113a, 113b and 113c in this order beginning from the near-center inner circumference of the optical disc.

In the PCA area 111, the writing laser power is calibrated. This area further includes a test area in which a trial write is actually made, and a count area in which the used status of this test area is recorded. In the PMA area 112, information such as a recording data mode, write start and write end positions, etc. are provisionally stored. These PCA and PMA areas 111 and 112 are only needed only at the time of data recording. After completion of the finalization, the optical pickup of the optical disc drive will not access these areas during data reading.

Each of the plurality of sessions 113a, 113b and 113c includes a lead-in area 114, program area 115 and a lead-out area 116 in this order beginning from the inner circumference of the optical disc.

The lead-in area 114 is used to read data written in the program area 115, and will have TOC (table of contents) information or the like written therein. At the time of data reading, the optical pickup can access a desired track by reading the TOC information written in the lead-in area 114. The lead-out area 116 will have variety of information on the optical disc recorded therein. The lead-out area 116 of the session area 113c located along the outermost circumference of the optical disc serves as a buffer area to prevent the optical pickup of the optical disc drive from overrunning.

The program area 115 will actually have user data written therein. As shown in FIG. 3B, a track number "TNO" is assigned to each track in this area correspondingly to the size of data recorded thereto. In the example shown in FIG. 3B, one session includes three data tracks 117a, 117b and 117c.

Each of the data tracks 117a, 117b and 117c to which a corresponding track number "TNO" is assigned includes two areas each having an "Index" as shown in FIG. 3C. An area 118 having an index of "00" will have TD (track descriptor) information which is track information written therein. Also, an area 119 having an index of "01" will have user data in units of a packet 120. That is, user data is continuously written at each packet 120 in the area 119 having the index of "01". Note that when user data is written in units of a packet, either a fixed-length packet method in which one packet has a length fixed to 32 data blocks or a variable-length packet method in which one packet is variable in length. The fixed-length packet method is adopted by way of example herein to write user data.

The packet 120 includes a plurality of data blocks 121. The data block 121 is a mass of data being a unit of access used when the optical disc drive accesses user data in the optical disc, and normally includes 2352 bytes of user data. Note that the data block 121 is also called "data sector".

The packet 120 has appended thereto a plurality of data linking blocks necessary for linking between this packet 120 and an adjacent packet 120. Each of the data linking blocks 122 is provided as a guard area, according to a predetermined linking rule, to prevent user data from missing at a linking position due to interleaving of the user data. As shown in FIG. 3D, the data linking block 122 includes a linking block 123 appended to the head of the packet 120, a plurality of run-in blocks 124 provided next to the linking block 123, and a plurality of run-out blocks 125 appended to the tail of the packet 120. More specifically, a preceding packet 120 and a packet 120 trailing the preceding packet 120 will be linked to each other by the plurality of data linking blocks 122 including the run-out block 125 appended to the tail of the preceding packet 120, linking block 123 and the run-in block 124 appended to the head of the trailing packet 120.

Figure 4:
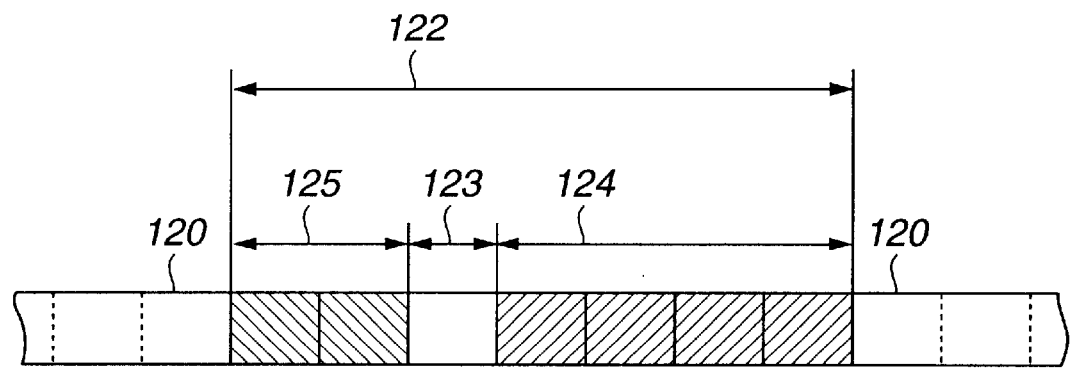
FIG. 4 shows an example of data linking blocks appended to between packets.

FIG. 4 shows an example of the data structure at a position where the packets 120 are linked to each other according to the linking rule adopted in the CD-R having the current format. In this example shown in FIG. 4, two run-out blocks 125 are appended to the tail of the preceding packet 120 and one linking block 123 and four run-in blocks 124 are appended to the head of the trailing packet 120. Therefore, the packets 120 including 32 data blocks 121 for example are linked to each other by seven data linking blocks 122. Note that a CD-R (will be referred to as "double-density CD-R" hereunder) having a recording density about double that of the CD-R having the current format (will be referred to as "normal-density CD-R" hereunder), adopts a different linking rule from the one adopted in the normal-density CD-R, and has a data structure at the linking position, different from that in the normal-density CD-R, as will further be described later.

Next, the format of data recorded to the CD-R will be described herebelow. User data recorded to the CD-R is subjected to convolution type cross error-correction coding, called "CIRC (cross interleave Reed-Solomon code)", and also to EFM (eight to fourteen modulation) before being written to the optical disc.

In the CIRC error-correction coding, data is coded with a Reed-Solomon code (C2 code) at each data unit of 24 bytes (12 words) and a 4-byte parity (Q parity) is appended to the coded data. User data and Q parity, of 28 bytes in total, are interleaved, and then subjected to coding by a Reed-Solomon code (C1 code), and further a 4-byte parity (P parity) is appended to the coded data, thereby providing a total of 32 bytes of data.

Figure 5:
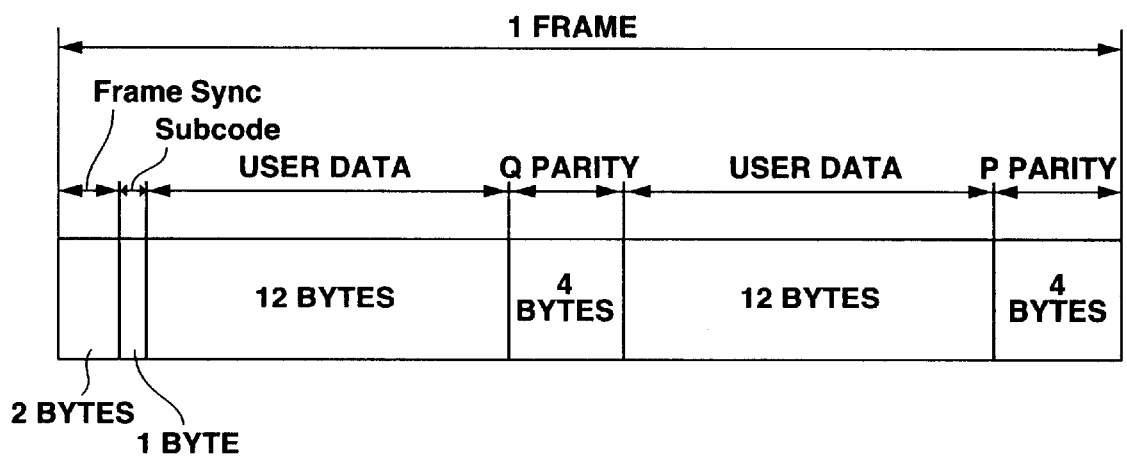
FIG. 5 shows a frame structure of data to be recorded to the CD-R in FIG. 1.

As in the above, the 4-byte Q parity and 4-bytes P parity are appended to each user data of 24 bytes by the CIRC error-correction coding to provide the 32 bytes of data. A 2-byte frame sync and 1-byte subcode are appended to the 32 bytes of data to form one frame which is a data transmission unit, as shown in FIG. 5.

Figure 6:
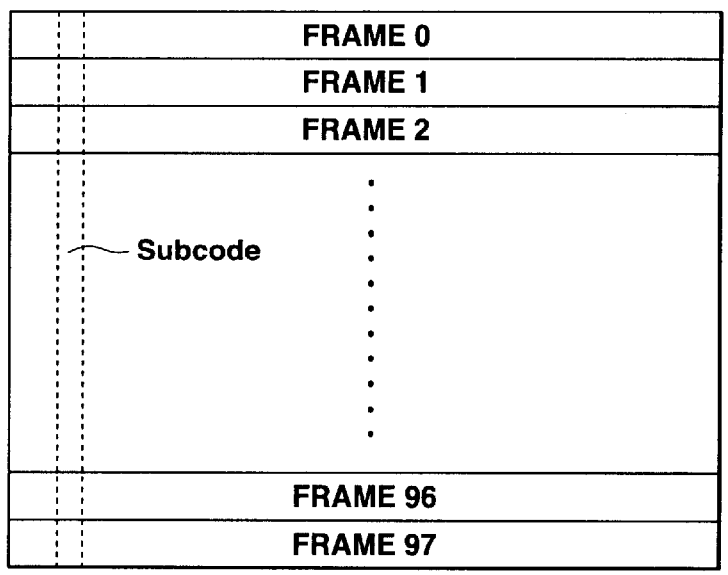
FIG. 6 shows a data block structure of data to be recorded to the CD-R in FIG. 1.

The above subcode includes eight channels P to W, and one bit for each channel (one byte in total) is inserted in each frame. Subcodes in a total of 98 frames will complete a piece of data. As shown in FIG. 6, a data block (data sector) being a unit of access in which th optical disc drive will access the subcode is composed of the 98 frames of which the subcodes complete one data unit.

Figure 7:
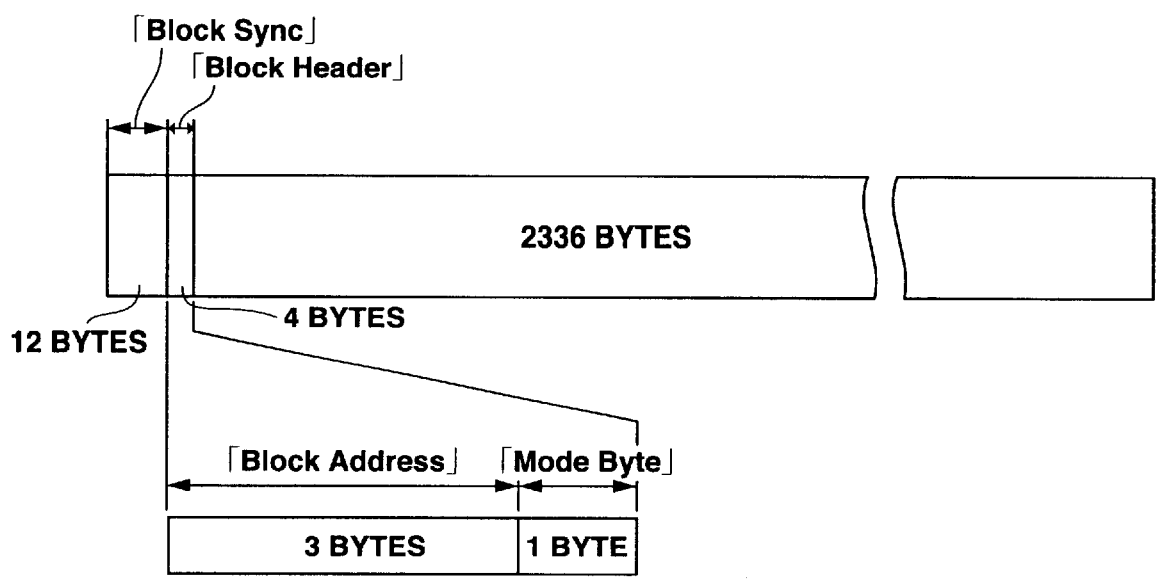
FIG. 7 shows a data structure of user data.

User data included in one data block is of 2352 bytes (24 bytes by 98) in total, and it includes, at the head thereof, 12 bytes of block sync signal and 4 bytes of block header as shown in FIG. 7. In the block header, 3 bytes thereof is assigned as a block address, and the rest (1 byte) is assigned as a mode byte which indicates the attribute of the block.

Figure 8:
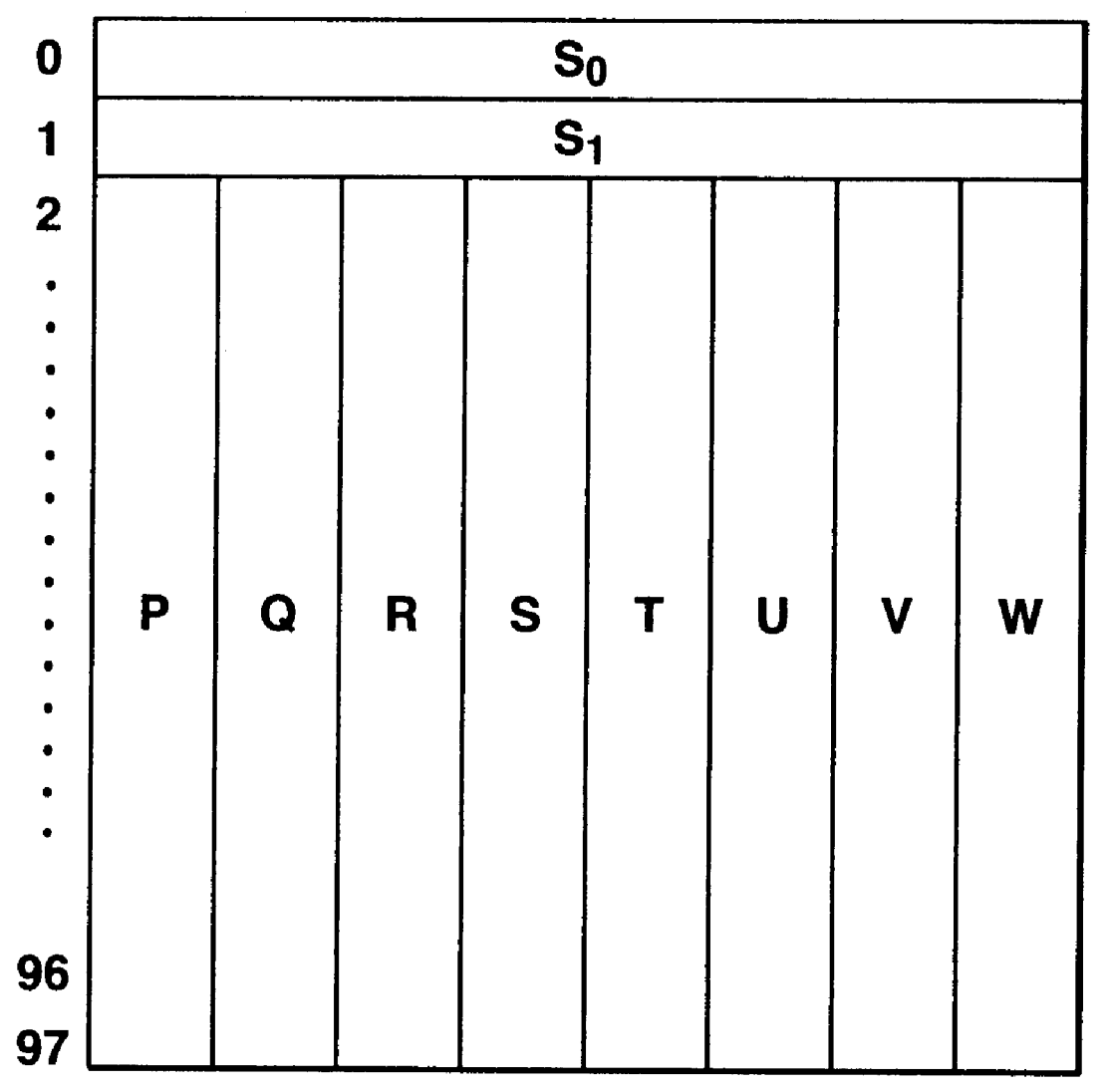

Also, the subcodes included in one data block are a total of 98 bytes of data of which the first 2 bytes are assigned to a subcode sync signal "$S_0$, $S_1$" as shown in FIG. 8. The remaining 96 bytes are assigned to channels P to W. Of these channels, the channels P and Q are used for access to a data block to which the subcodes belong, and the channels R to W are used to record incidental data.

For example 32 data blocks in the data organized as in the above are used as one packet 120, and the data will be written in units of the packet 120 to the CD-R by means of the data linking blocks 122.

The optical disc drive according to the present invention is adapted to support both the normal-density CD-R having the current format, and the double-density CD-R having a recording density about two times higher than that of the normal-density CDR. The double-density CD-R has the recording density increased to about double that of the normal-density CD-R by reducing the track pitch TP thereof to smaller than that in the normal-density CD-R and increasing the linear density thereof to higher than that in the normal-density CD-R. More particularly, the recording density of the double-density CD-R is such that 1 GB or more of data can be recorded. In the normal-density CD-R, the track pitch TP is set about 1.6 $\mu$m while in the double-density CD-R, it is set about 1.1 $\mu$m. In the normal-density CD-R, the smallest bit length (3T) is about 0.83 $\mu$m while in the double-density CD-R, the smallest bit length (3T) is about 0.62 $\mu$m.

As in the above, in the double-density CD-R whose recording density is double that of the normal-density CD-R, a defect such as scratch to a recording mark will correspondingly be larger than that in the normal-density CD-R and the burst error length will be larger than in the normal-density CD-R. As a result, the double-density CD-R will be more susceptible to a burst error than the normal-density CD-R.

To solve the above problem, when the optical disc drive according to the present invention writes and/or reads data to and/or from the normal-density CD-R, it effects the CIRC error-correction coding and error correction in one manner, while for writing and/or reading data to and/or from the double-density CD-R, it effects the coding and correction in other manner slightly different from that used for the normal-density CD-R. Thereby, the optical disc drive according to the present invention can most suitably deal with each of these optical discs. More specifically, a delay parameter D in the CIRC interleaving is set to 4 (frames) for data write and/or read to and/or from the normal-density CD-R while it is set to 7 (frames) for data write and/or read to and/or from the double-density CD-R.

The delay parameter D is a unit delay in the CIRC interleaving. That is, the CIRC interleaving is effected in units of a total of 28 bytes of data including 24 bytes of data and 4 byes of Q parity to delay each data by 0, D, 2D, . . . , 27D. Therefore, when the delay parameter D is set to 4 (frames), the maximum delay will be 108 (=27×4) frames. When the delay parameter D is set to 7 (frames), the maximum delay will be 189 (=27×7) frames.

The optical disc drive according to the present invention has an improved ability of correcting a burst error by using one delay parameter D in the CIRC interleaving for data write and/or read to and/or from the normal-density CD-R and another delay parameter D for data write and/or read to and/or from the double-density CD-R, respectively, and interleaving the data to be written to the double-density CD-R having the higher recording density with a larger maximum delay.

The results of experiments proved that when the data to be written to the double-density CD-R has been interleaved with a larger maximum delay, if the data is linked according to the linking rule applied to the normal-density CD-R, the data cannot properly be linked, while will further be described herebelow:

The linking rule applied in the normal-density CD-R having the current format is "general linking rule". According to this general linking rule, data write has to be stopped at a position 26 (+4/–0) EFM frames (transmission frames) from the leading edge of the subcode sync signal "$S_0$, $S_1$" and data write has to be restarted at a position 26 (+0/–4) EFM frames from the leading edge of the subcode sync signal "$S_0$, $S_1$". The EFM frame is a unit of data transmission and the same as the frames forming together the aforementioned data block. The reason why the data write stop and restart positions are not determined with reference to the leading edge of the block sync signal but to the leading edge of the subcode sync signal "$S_0$, $S_1$" is that since the block sync signal is also interleaved, it will not be able to be read after being interleaved.

The linking rule applied in the normal-density CD-R is such that two run-out blocks are to be written at the tail of a preceding data according to a "data linking rule", data write has to be stopped in a linking block trailing the data according to the "general linking rule", data write has to be restarted in the linking block according to the "general linking rule", and subsequent data have to be written after writing four run-in blocks. Note that according to the linking rule, the block sync signal for restarting the data write has to have the leading edge thereof (before data coding using a minimum delay encoder) within a range of +36/–10 EFM frames from the leading edge of the subcode sync signal "$S_0$, $S_1$" included in the data block. The "minimum delay encoder" means an encoder having not any circuit delay other than the intentional delay by the interleaving. Note that unless otherwise specified in the trailing description, a deviation between the leading edges of the block sync signal and subcode sync signal "$S_0$, $S_1$" is a deviation between the leading edge of the block sync signal before being coded by the "minimum delay encoder" and that of the subcode sync signal "$S_0$, $S_1$".

According to the aforementioned linking rule, two run-out blocks will be provided at the tail of a preceding data and one linking block and four run-in blocks be provided at the head of a trailing data, when the data area linked to each other. Thus, the user data will be linked by means of these seven data linking blocks.

The seven data linking blocks are provided to prevent user data from missing at the linking position due to the CIRC interleaving. That is, the run-out blocks are provided as a buffer to assure that a preceding data can correctly be written until it is completely written, and the linking block is provided as an area where data is actually linked. The run-in blocks are provided to assure correct data write from the beginning of a trailing user data and correct re-synchronization before the head of the user data is reached, at the time of data read after data write is restarted.

Data linkage effected according to the aforementioned linking rule in the normal-density CD-R will be described below with reference to FIGS. 9 to 11. Note that in FIGS. 9 to 11, data status before being subjected to the CIRC interleaving is shown in the upper portion of each of the drawings while data status after being interleaved with a delay parameter D of 4 (frames) is shown in the lower portion. Also, in the data after being so interleaved, shown in the lower portion in FIGS. 9 to 11, data series to be subjected to error correction by the C2 code is shown vertically in the direction of arrow A while data series to be subjected to error correction by the C1 code is shown obliquely in the direction of arrow B.

Figure 9:
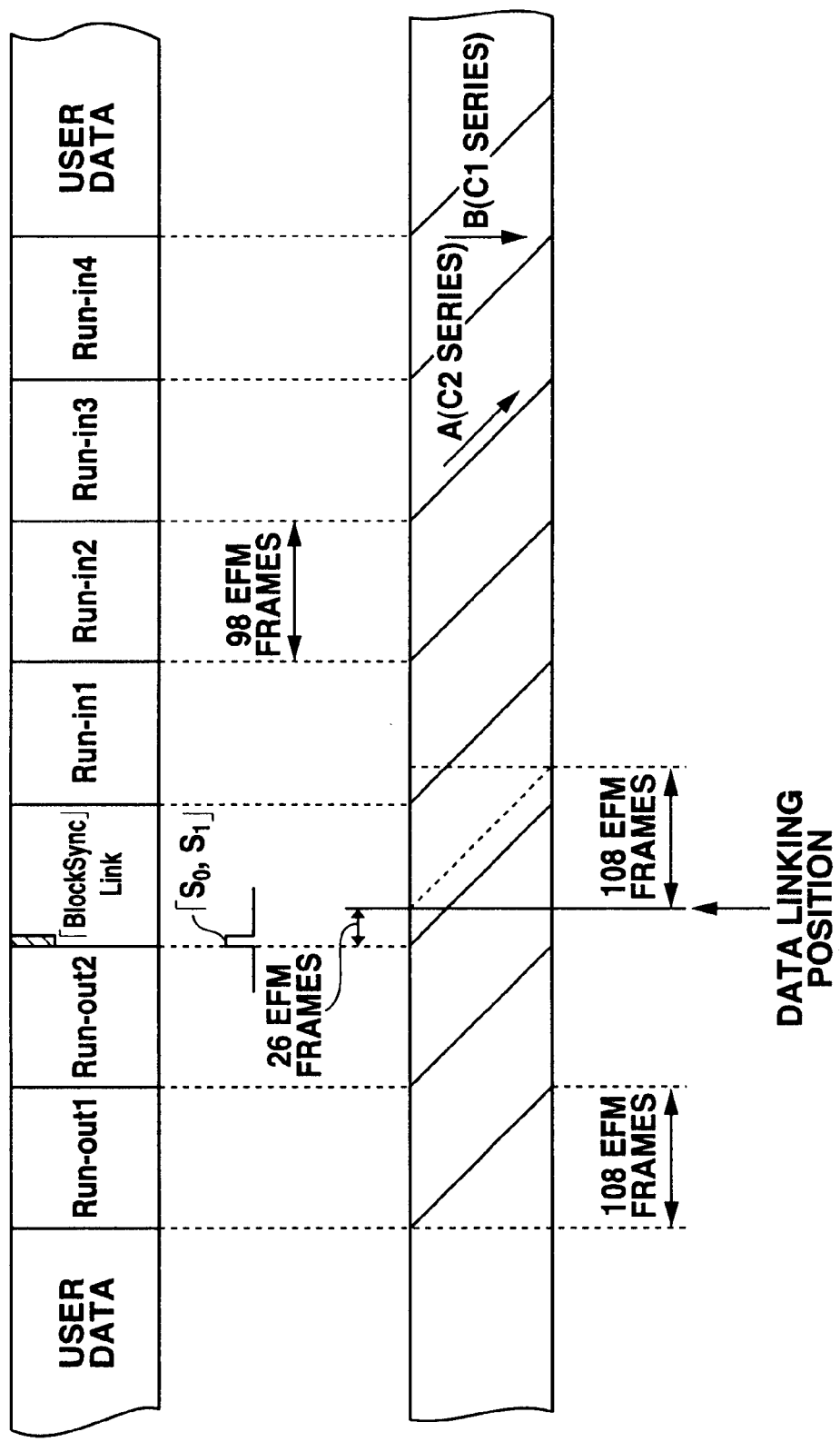
FIG. 9 is a schematic view of linkage of data interleaved with a maximum delay of 108 EFM frames, showing a data linkage made at a position 26 EFM frames after the leading edge of a block sync signal.

In FIG. 9, there is schematically shown a data linkage made at a position 26 EFM frames after the leading edge of the subcode sync signal "$S_0$, $S_1$" under the assumption that the leading edge of the block sync signal used at the time of write restart coincides with that of the subcode sync signal "$S_0$, $S_1$," included in the data block.

Data interleaved with a delay parameter D of 4 (frames) will have a delay of 108 EFM frames at the maximum as having been described above. When the data is linked at a position 26 EFM frames from the leading edge of the subcode sync signal "$S_0$, $S_1$", the latter half of the second run-out block in the data before the write stop position will trail the linking position, so data in this range will be missing. Thus, the second run-out block will not correctly be read. However, since all the first run-out blocks precede the linking position, they can correctly be read. Of course, since user data before the write stop position precedes the first run-out block, it can correctly be read.

On the other hand, in the data after the write restart position, since data included within a range of up to 108-th EFM frame from the linking position include one having been interleaved before and also after the write stop position, it will not be able to correctly be read, and so the first run-in block will not be able to correctly be read. However, the second and subsequent run-in blocks can correctly be read. Of course, user data after the write restart position can correctly be read since they are after the fourth run-in block.

As in the above, the linking rule is such that when linking data having been interleaved with the delay parameter D of 4 and maximum delay of 108 EFM frames, the user data can of course be read correctly, and at least one run-out block and one run-in block can correctly be read. Also, a number of run-in blocks, possibly larger than really required, are provided so that positive re-synchronization therewith is assured at the time of data read after data write is restarted.

Since each of the data linking blocks are a data block to which no user data is written, namely, a data block which is meaningless as user data, the optical disc drive has to positively detect when the data linking blocks being meaningless as user data have been reached or when there are no more such data linking bocks.

For the optical disc drive to detect when the data linking blocks have been reached, it is necessary to detect the mode byte existent in the block header of the run-out block. Namely, since the mode byte has information indicative of the attribute of a block as having previously been described, the optical disc drive can know that the block it has reached is included in the run-out blocks and detect when it has reached the data linking blocks, by detecting the mode byte.

In the example shown in FIG. 9, the second run-out block will not correctly be read and no mode byte can be detected from the second run-out block. However, since the first run-out block is correctly read, the optical disc drive can detect, by detecting the mode byte in the first run-out block, when it has reached the data linking blocks.

On the other hand, to detect when there are no more data linking blocks, it is necessary to detect the mode byte in the block header of the run-in block. That is, by detecting the mode byte in the block header of the run-in block, it is possible to know that the block in consideration is included in the run-in blocks and detect when there are no more data linking blocks.

In the example shown in FIG. 9, the first run-in block will not correctly be read and no mode byte can be detected from the first run-in block. However, since the second and subsequent run-in blocks are read correctly, the optical disc drive will be able to detect, by detecting the mode byte in any of the second and subsequent run-in blocks, when there are no more data linking blocks.

In the above linking rule, the leading edge of the block sync signal used at the time of write start is allowed to be shifted +36/−10 EFM frames from the leading edge of the subcode sync signal "$S_0$, $S_1$.". In other words, the leading edge of the subcode sync signal "$S_0$, $S_1$" is allowed to be shifted +10/−36 EFM frames from the leading edge of the block sync signal. Also, in the linking rule, it is allowed that there is a shift of ±4 EFM frames as measured at the linking position 26 EFM frames from the leading edge of the subcode sync signal "$S_0$, $S_1$".

Figure 10:
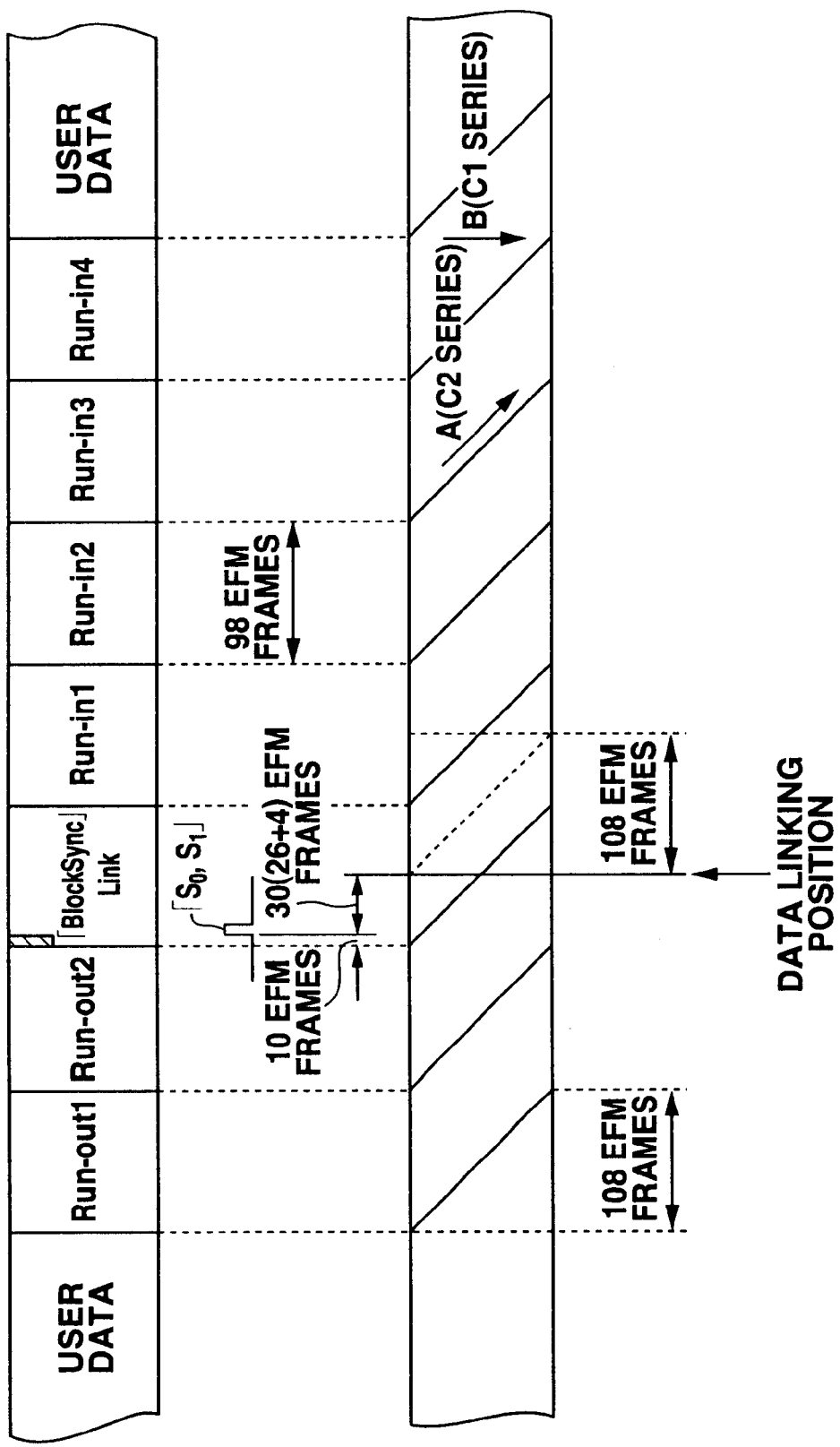
FIG. 10 is a schematic view of linkage of data interleaved with a maximum delay of 108 EFM frames, showing a data linkage made at a position 40 EFM frames after the leading edge of the block sync signal.

Therefore, when the linking position has a largest shift to the data side (run-in block) after the write restart position within an allowable range in the linking rule, it will come to a position 40 EFM frames after the leading edge of the block sync signal used at the time of write restart as shown in FIG. 10.

As seen from FIG. 10, also when the linking position is shifted to the run-in block side and comes to the position 40 EFM frames after the leading edge of the block sync signal used at the time of write restart, the second run-out block will not be able to correctly be read but the first run-out block can correctly be read. Therefore, by detecting the mode byte in the first run-out block, it is possible to detect when the data linking blocks have been reached. Of course, user data before the first run-out block can also be read correctly.

Further as seen from FIG. 10, also when the linking position is shifted to the run-in block side and comes to a position 40 EFM frames after the leading edge of the block sync signal, the first run-in block cannot correctly be read as in the case where the linking position has no shift, but the second and subsequent run-in blocks can correctly be read. Therefore, by detecting the mode byte in any of the second and subsequent run-in blocks, it is possible to detect when there are no more data linking blocks. Also, user data after the fourth run-in block can also be read correctly.

Figure 11:
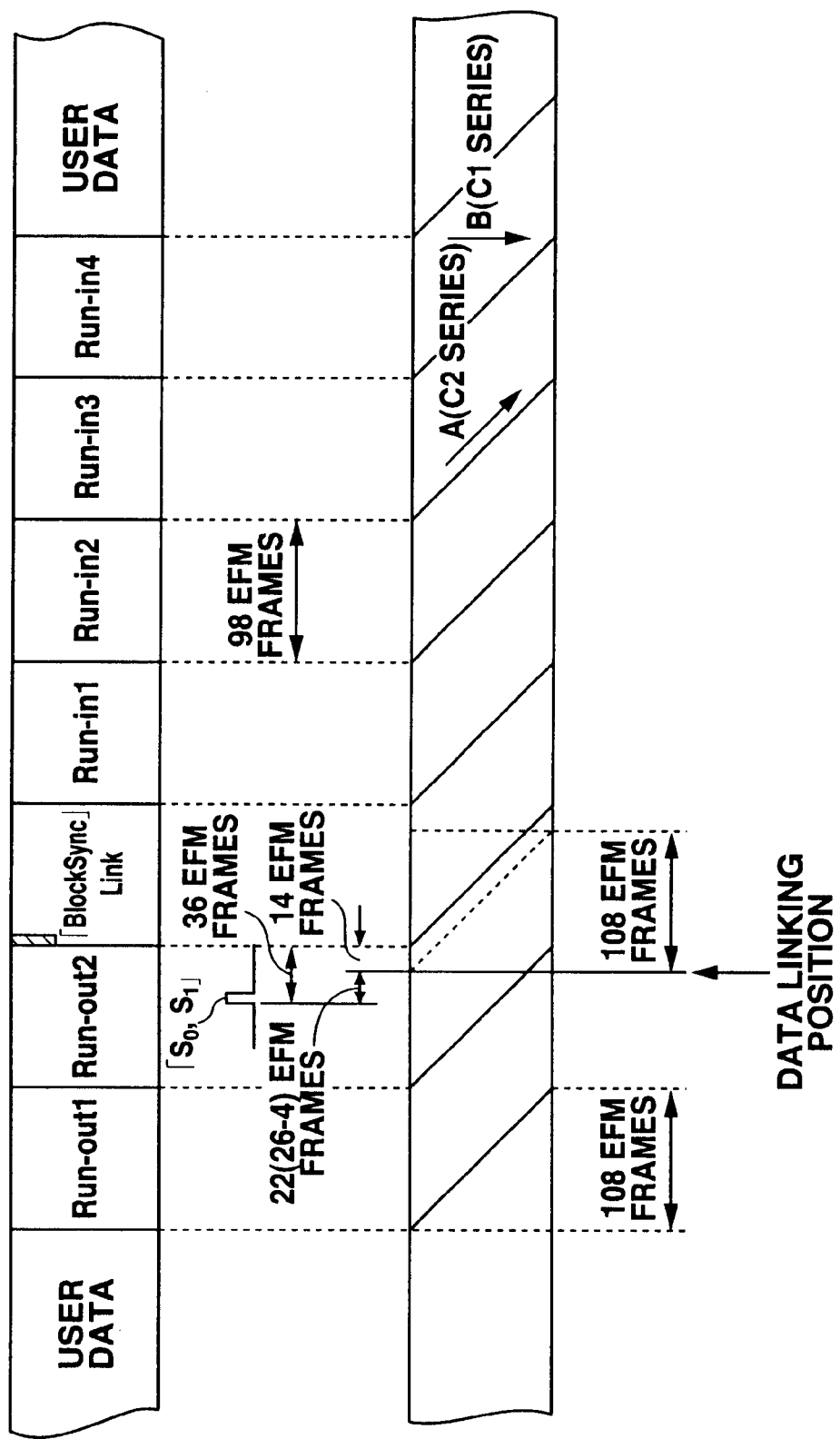
FIG. 11 is a schematic view of linkage of data interleaved with a maximum delay of 108 EFM frames, showing a data linkage made at a position 14 EFM frames before the leading edge of a block sync signal.

On the other hand, when the linking position has a largest shift to the data side (run-out blocks) after the write stop position within an allowable range in the linking rule, it will come to a position 14 EFM frames before the leading edge of the block sync signal used at the time of write restart as shown in FIG. 11.

As seen from FIG. 11, when the linking position is shifted to the run-out block side and comes to the position 14 EFM frames before the leading edge of the block sync signal used at the time of write restart, many of the latter half of the second run-out block and only a small portion of the latter half of the first run-out block will trail the linking position. The second run-out block cannot correctly be read since many of the latter half thereof trails the linking position. However, since only a small portion of the first run-out block is after the linking position, data missing of this extent can be compensated by the error correction. Therefore, by detecting the mode byte in the first run-out block, it is possible to detect when the data linking blocks have been reached. Of course user data before the first run-out block can also be read correctly.

Further as seen from FIG. 11, also when the linking position is shifted to the run-out block side and comes to a position 14 EFM frames before the leading edge of the block sync signal, the first run-in block cannot correctly be read as in the case where the linking position has no shift or is shifted to the run-in block side, but the second and subsequent run-in blocks can correctly be read. Therefore, by detecting the mode byte in any of the second and subsequent run-in blocks, it is possible to detect when there are no more data linking blocks. Of course, user data after the fourth run-in block can also be read correctly.

As in the above, when data having been interleaved with a delay parameter D of 4 and maximum shift of 108 EFM frames is linked, user data can of course be read correctly by following the interlinking rule, and it is possible, by reading the run-out and run-in blocks, to properly detect when the data linking blocks being meaningless as user data have been reached and when there are no more data linking blocks.

Next, data linkage effected according to the linking rule in the double-density CD-R in which data interleaved with a delay parameter D of 7 and maximum delay of 189 EFM frames is linked, will be described herebelow with reference to FIGS. 12 to 14. Note that in FIGS. 12 to 14, data status before being subjected to the CIRC interleaving is shown in the upper portion of each of the drawings while data status after being interleaved with a delay parameter D of 7 (frames) is shown in the lower portion. Also, in the data after being so interleaved, shown in the lower portion of each of the drawings, data series to be subjected to error correction by the C2 code is shown vertically in the direction of arrow C while data series to be subjected to error correction by the C1 code is shown obliquely in the direction of arrow D.

Figure 12:
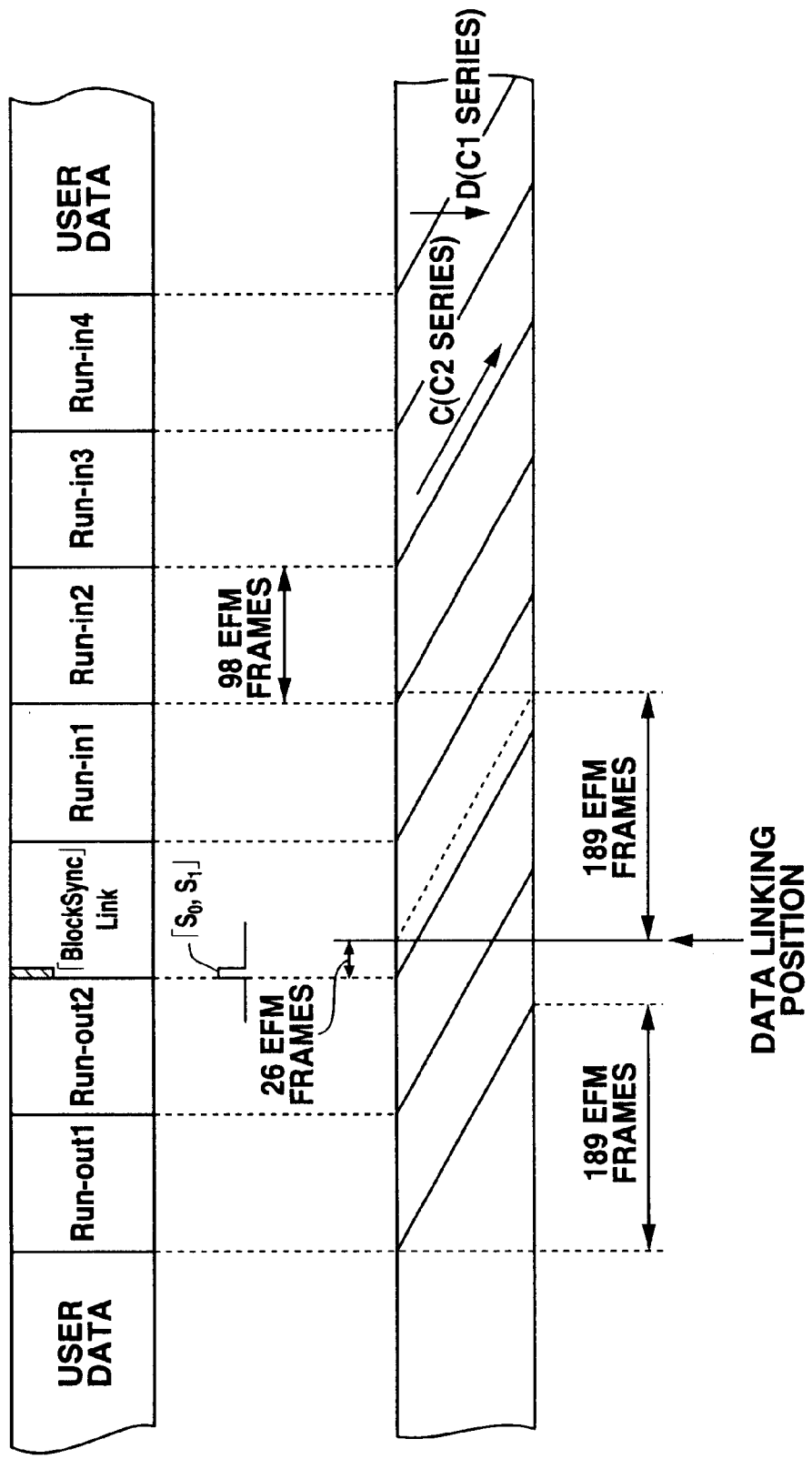
FIG. 12 is a schematic view of linkage of data interleaved with a maximum delay of 189 EFM frames, showing a data linkage made at a position 26 EFM frames after the leading edge of a block sync signal.

In FIG. 12, there is schematically shown a data linkage made at a position 26 EFM frames after the leading edge of the subcode sync signal "$S_0$, $S_1$" on the assumption that the leading edge of the block sync signal used at the time of write restart coincides with that of the subcode sync signal "$S_0$, $S_1$" included in the data block.

Data interleaved with a delay parameter D of 7 (frames) will have a maximum delay of 189 EFM frames as having been described above. When the data is linked at a position of 26 EFM frames from the leading edge of the subcode sync signal "$S_0$, $S_1$", the majority of the second run-out block in the data before the write stop position will trail the linking position, while a portion of the latter half of the first run-out block will be after the linking position, so data in this range will be missing. Thus, the second run-out block will not correctly be read, and the first run-out block may not possible read correctly. However, since it is only a part of the latter half of the first run-out block that is missing, this data missing can be compensated by the error correction as in the example shown in FIG. 11. In the example shown in FIG. 12, however, since the rate of data missing is larger than in the example shown in FIG. 11, there is a high impossibility of compensating the data missing by the error correction.

As in the above, in the example shown in FIG. 12, neither the second run-out block nor the first run-out block can correctly be read in some cases. Thus, in the example shown in FIG. 12, it is impossible as the case may be to detect when the data linking blocks being meaningless as user data have been reached.

On the other hand, in the data after the write restart position, since data included within a range of 189 EFM frames from the linking position include one having been interleaved before and also after the write stop position, it will not be able to correctly be read, and so the first and second run-in blocks will not be able to correctly be read. However, since four run-in blocks are provided in the data after the write restart position, the third and subsequent run-in blocks can correctly be read. That is, even when data after the write restart position has been interleaved with a delay parameter D of 7 and maximum delay of 189 EFM frames, the run-in blocks can correctly be read and it is possible to detect when there are no more linking blocks being meaningless as user data.

Next, data linkage effected when the linking position has a largest shift to the run-in block side within an allowable range in the linking rule, namely, at a position 40 EFM frames after the leading edge of the block sync signal used at the time of write restart, will be described herebelow with reference to FIG. 13.

Figure 13:
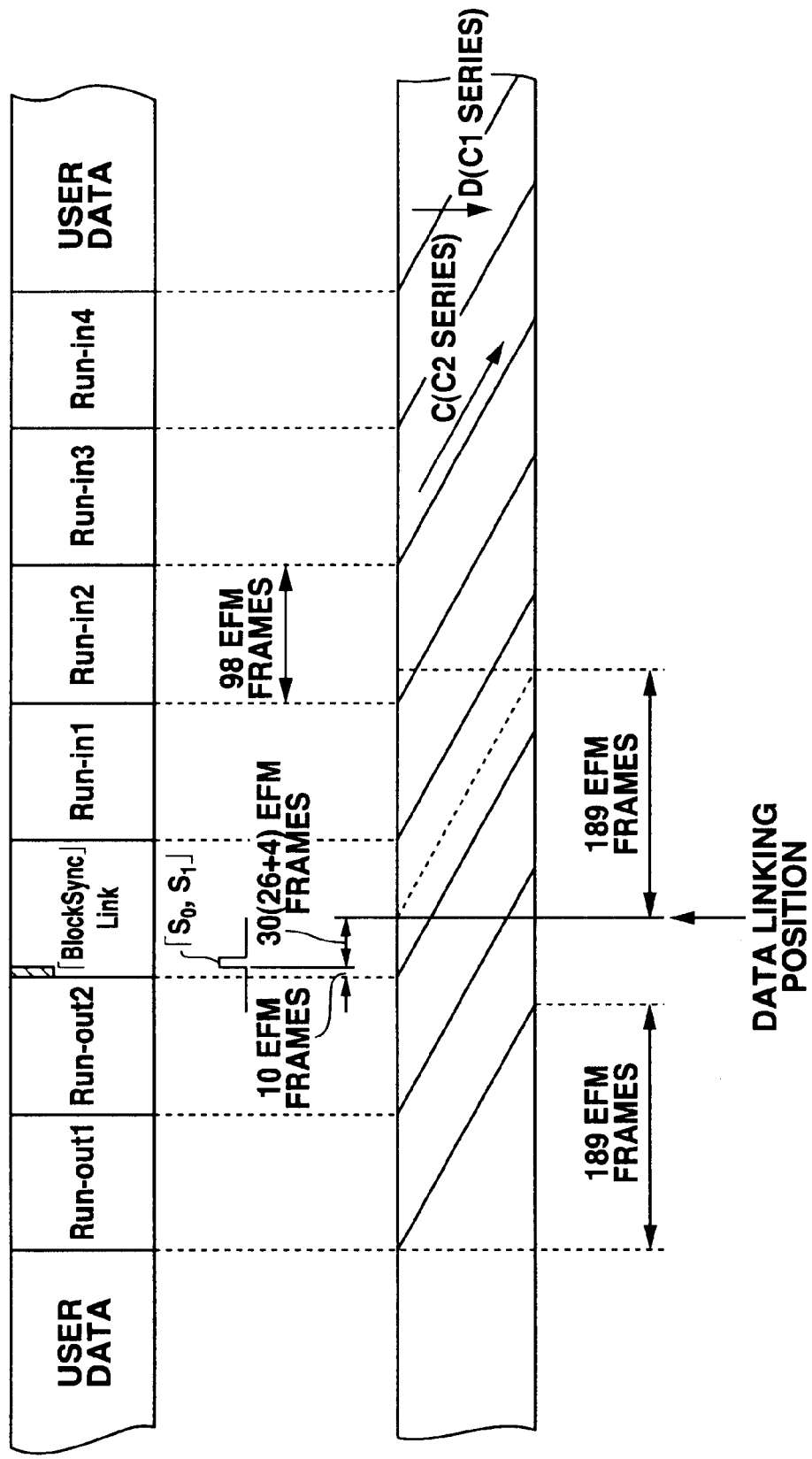
FIG. 13 is a schematic view of linkage of data interleaved with a maximum delay of 189 EFM frames, showing a data linkage made at a position 40 EFM frames after the leading edge of a block sync signal.

As seen from FIG. 13, also when the linking position is shifted to the run-in block side and comes to a position 40 EFM frames after the leading edge of the block sync signal used at the time of write restart, the second run-out block cannot correctly be read as in the aforementioned case where there is no shift of the linking position, and there is also an impossibility of correctly reading the first run-out block. Also in the example shown in FIG. 13, it is impossible, as the case may be, to detect when the data linking blocks being meaningless as used data have been reached.

Also as seen from FIG. 13, also when the linking position is shifted to the run-in block side and comes to a position 40 EFM frames after the leading edge of the block sync signal used at the time of write restart, neither the first nor second run-in block can correctly be read as in the aforementioned case where there is no shift of the linking position. However, the third and subsequent run-in blocks can correctly be read and it is possible to detect when there are not more data linking blocks.

Next, data linkage effected when the linking position has a largest shift to the run-out side, namely, when the linking position comes to a position 14 EFM frames before the leading edge of the block syn signal used t the time of write restart, will be described herebelow with reference to FIG. 14.

Figure 14:
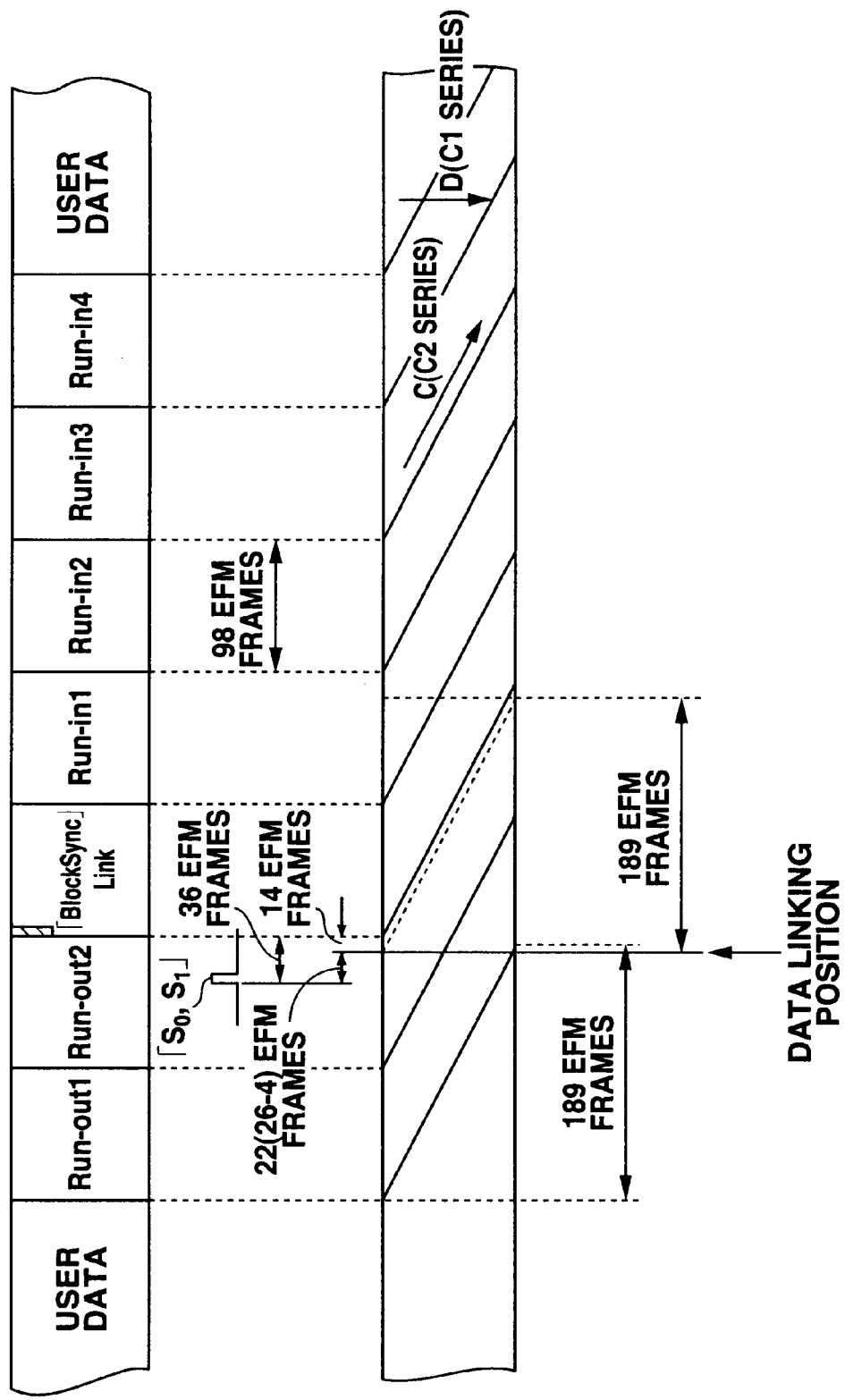
FIG. 14 is a schematic view of linkage of data interleaved with a maximum delay of 189 EFM frames, showing a data linkage made at a position 14 EFM frames before the leading edge of a block sync signal.

As seen from FIG. 14, when the linking position is shifted to the run-out block side and comes to the position 14 EFM frames before the leading edge of the block sync signal used at the time of write restart, the majority of the second run-out block and many of the latter half of the first run-out block will trail the linking position. Thus, in this example, neither the first run-out block nor the second run-out block will not be able to correctly be read and it will be impossible to detect when the data linking blocks have been reached.

Further in this example, it is known that only a small portion of the latter half of the user data preceding the write stop position will trail the linking position. Since only a small portion of the user data will trail the linking position, it is highly possible to compensate data missing of this extent by the error correction, but missing of highly important user data due to the data linking is a problem.

Also, as seen from FIG. 14, also when the linking position is shifted to the run-out block side and comes to a position 14 EFM frames before the leading edge of the block sync signal used at the time of write restart, the second and subsequent run-in blocks in the data after the write restart position can correctly be read and it is possible to detect when there are no more data linking blocks.

As in the above, when data having been interleaved with a delay parameter D of 7 and maximum delay of 189 EFM frames is linked, if the above linking rule is observed, the run-in blocks can correctly be read but the run-out blocks cannot correctly be read, it is not possible to properly detect when the data linking blocks being meaningless as user data have been reached, and highly important user data may possibly be missing. Therefore, data having been interleaved for such a maximum delay and written to the double-density CD-R has to be linked according to a most suitable optimum linking rule correspondingly to the delay thereof.

To link data interleaved with a maximum delay of 189 EFM frames so that the run-out blocks can correctly be read, the aforementioned linking rule may be changed such that data linking position will be shifted to the data whose writing has been restarted (to the run-in block side).

Figure 15:
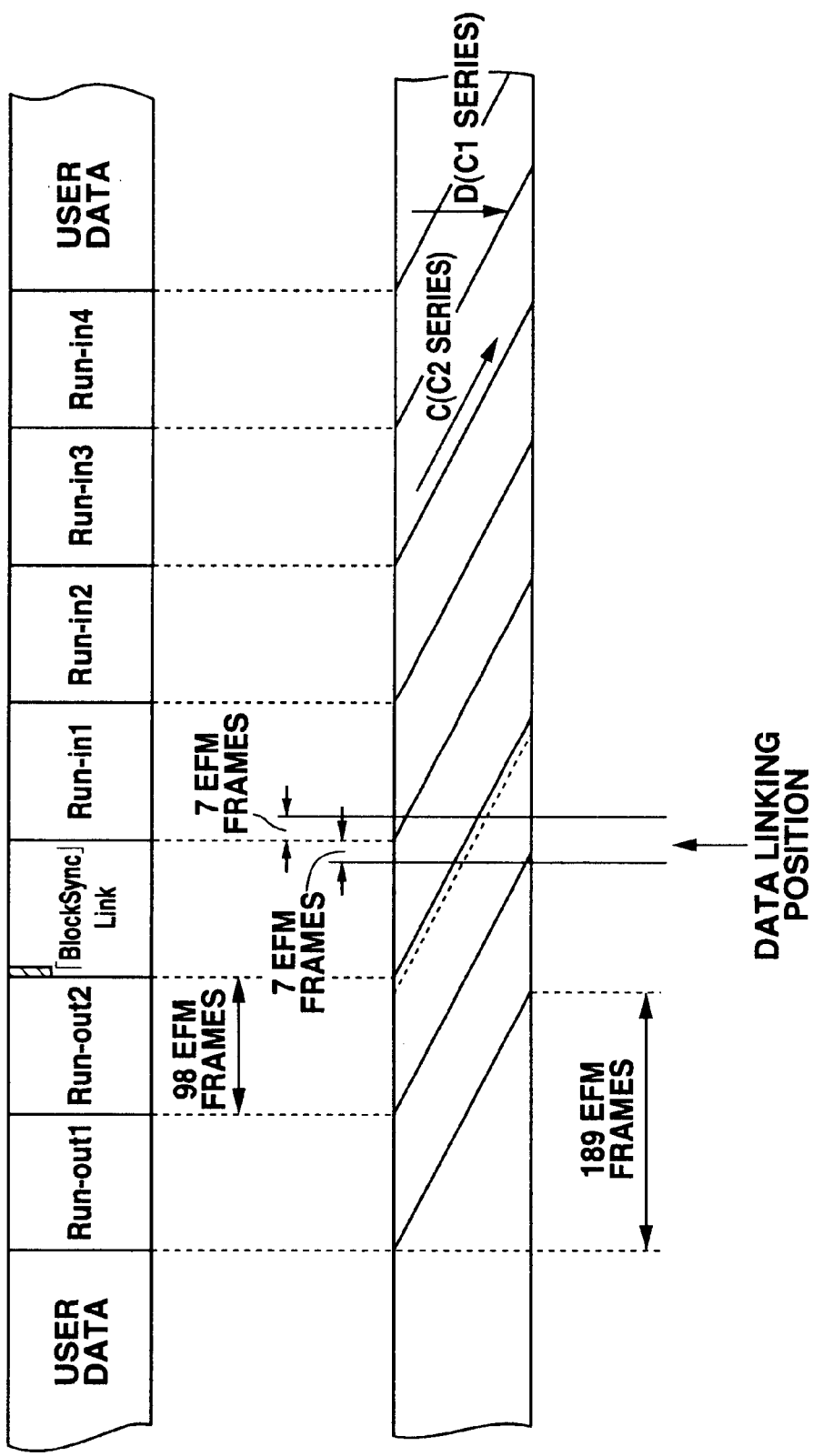
FIG. 15 is a schematic view of linkage of data interleaved with a maximum delay of 189 EFM frames, showing a data linkage made at a position 98 (±7) EFM frames after the leading edge of a block sync signal.

More specifically, as shown in FIG. 15 for example, by linking data within a range of 98 (±7) EFM frames from the leading edge of the block sync signal used at the time of write restart, the first run-out block can correctly be read and also the third and subsequent run-in blocks can correctly be read. In this case, however, the possible range of the data linking position is very narrow as compared with that in the case where the aforementioned linking rule is observed. Namely, the allowable shift (margin) will be extremely small. Thus, when a method of data recording at a high speed is adopted, there will be a likelihood that no proper linking will be possible.

Also, to link data having been interleaved with a maximum delay of 189 EFM frames so that the run-out blocks can correctly be read, the aforementioned linking rule may be modified such that three run-out blocks are provided at the tail of a preceding data.

Figure 16:
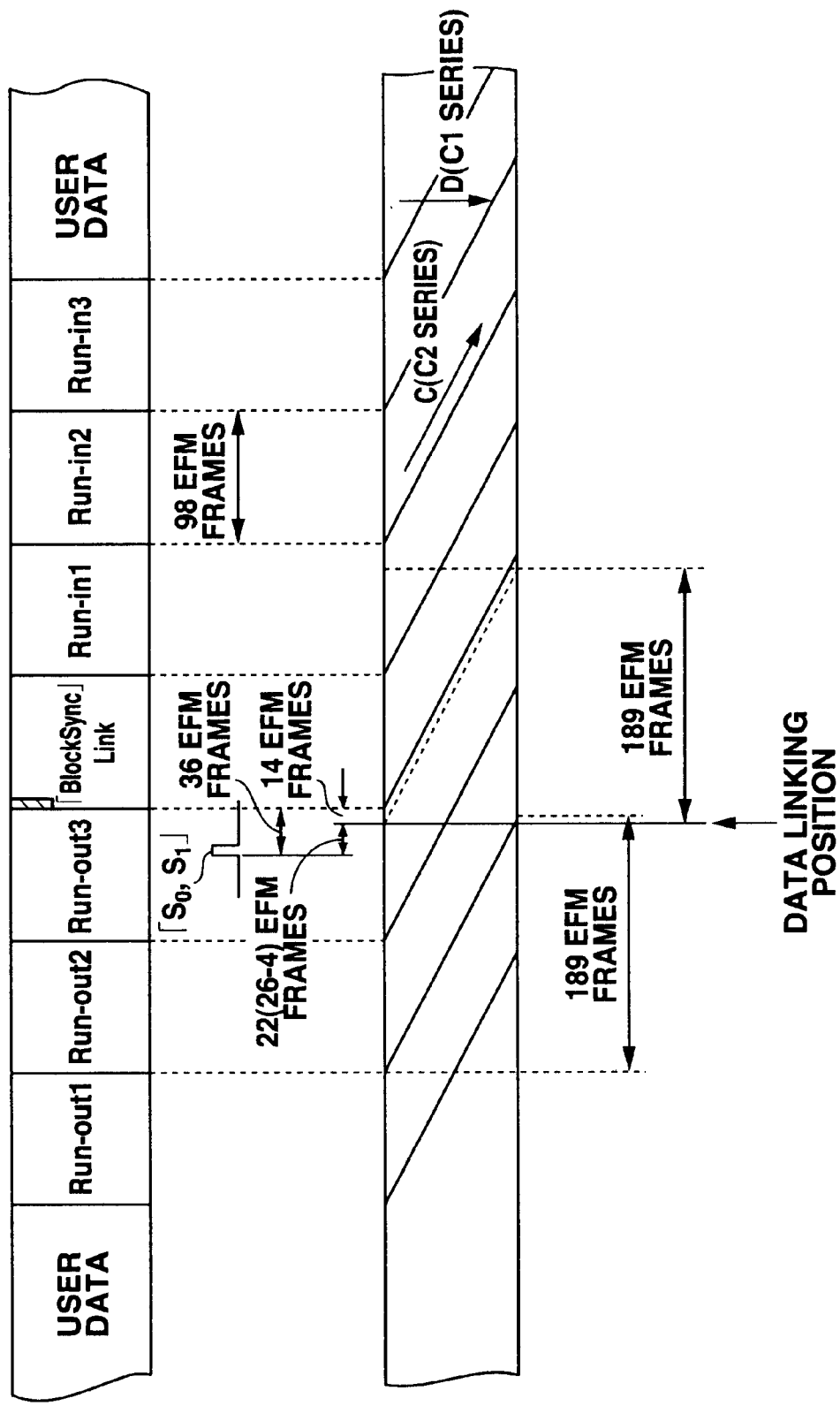
FIG. 16 is a schematic view of linkage of data interleaved with a maximum delay of 189 EFM frames, showing a data linkage made at a position 14 EFM frames before the leading edge of a block sync signal, made with three run-out blocks appended to the data.

More particularly, in case three run-out blocks are provided at the tail of a preceding data, when the linking position has a largest shift to the run-out block side as shown in FIG. 16, that is, even when data is linked at a position 14 EFM frames before the leading edge of the block sync signal used at the time of write restart, it is only possible that only a small part of the latter half of the first one of the run-out blocks will trail the linking position, and data missing of such an extent can be compensated by the error correction. Therefore, the first run-out blocks can correctly be read, and it will be possible, by detecting the mode byte in the first run-out block, to detect when the data linking blocks have been reached. Also, user data before the first run-out blocks will of course be able to correctly be read.

As in the above, when linking having been interleaved with a maximum delay of 189 EFM frames, provision of three run-out blocks at the tail of a preceding data will permit to link the data so that the run-out blocks can correctly be read, without reducing the margin.

When the three run-out blocks are provided at the tail of the preceding data, since there is a total of seven data linking blocks as usual, it is desired to reduce to three the four run-in blocks which are to be provided according to the aforementioned linking rule.

In the aforementioned linking rule, it is defined that four run-in blocks which may possibly be more than actually required should be provided to assure a positive re-synchronization at the time of data read after the data write is restarted. Actually, however, it has been proved heretofore that the re-synchronization can be assured with less than four run-in blocks. Namely, to make re-synchronization, it is necessary to detect the mode byte in the run-in blocks. For detection of the mode byte, the block sync signal is extracted from data row having been subjected to CIRC error correction, and depending upon the mode of data write and/or read to and/or from the CD-R, the mode byte is detected after the block sync signal is subjected to ECC (error correction code) error correction. Thus, the reliability of the detected data is very high and if at least the run-in block just before user data can correctly be read, re-synchronization can be made almost without fail. As seen from the example shown in FIG. 13, even when the data linking position has a largest shift to the run-in block side, the third run-in block can correctly be read, so that even with three run-in blocks, resynchronization can be made almost without fail.

As in the above, when linking data having been interleaved with a maximum of 189 EFM frames, three run-out blocks are provided at the tail of a preceding data and one linking block and three run-in blocks are provided at the head of a trailing data. The user data can be linked properly by using these seven data linking blocks, without increasing the total number of data linking blocks being meaningless as user data.

In the optical disc drive according to the present invention, data is linked in one manner in the normal-density CD-R, while data is linked in other manner in the double-density CD-R. For data linking in the normal-density CD-R, two run-out blocks are provided at the tail of a preceding data according to the aforementioned existing linking rule, and for data linking in the double-density CD-R, three run-out blocks are provided at the tail of a preceding data.

Figure 17:
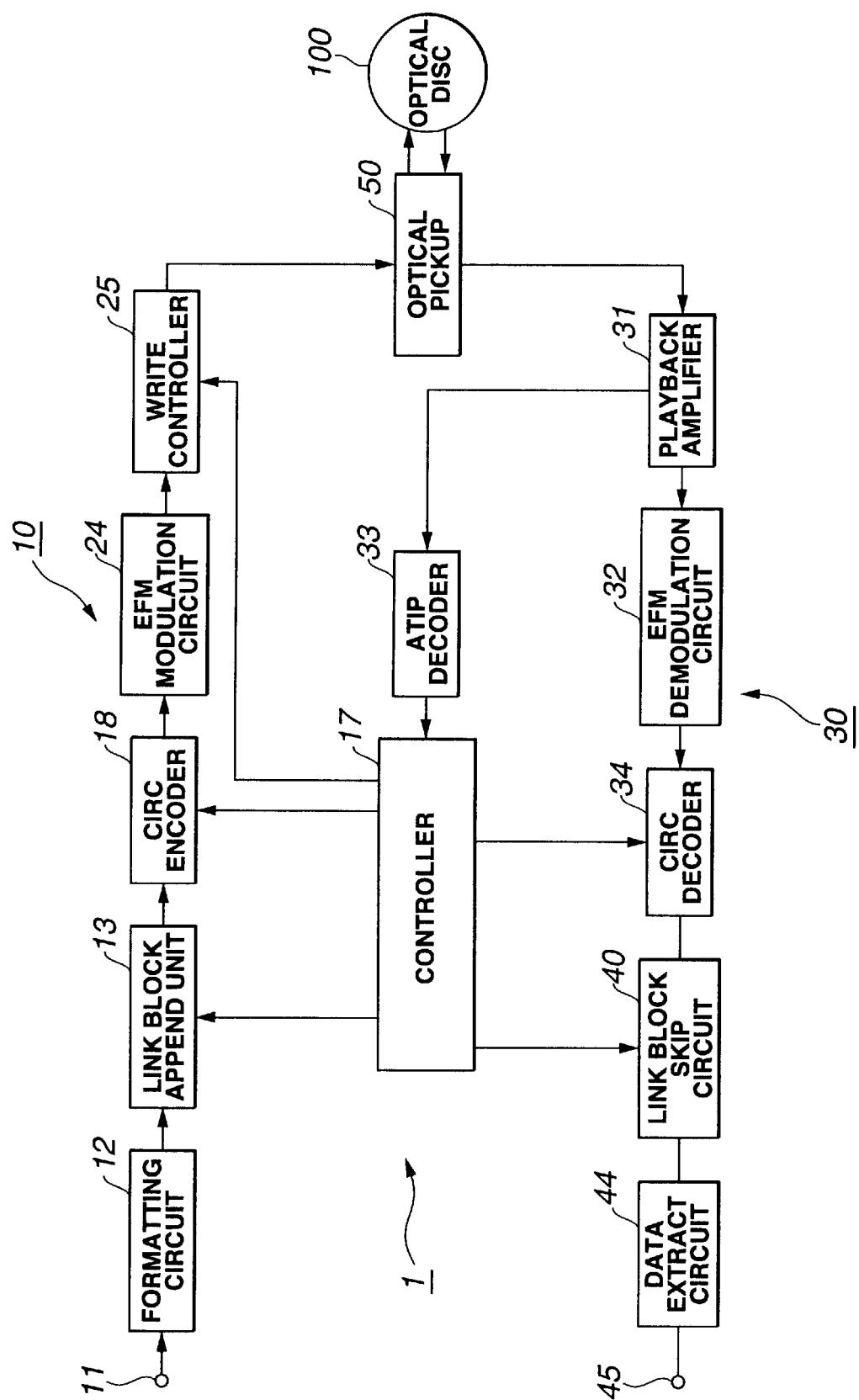
FIG. 17 is a block diagram of an example construction of the optical disc drive according to the present invention.

Next, the optical disc drive according to the present invention will be described in detail below. FIG. 17 shows an example construction of the optical disc drive. In FIG. 17, the optical disc drive is generally indicated with a reference 1. This optical disc drive 1 is constructed to write and/or read data to and/or from the CD-R (recordable optical disc) and support both the normal-density CD-R having the current format and the double-density CD-R having a recording density about two times higher than the normal-density CD-R.

As shown, the optical disc drive 1 includes a data recording system generally indicated with a reference 10 and which records data supplied to a host computer or the like to a CD-R 100, and a data playback system generally indicated with a reference 30 and which reads data recorded in the CD-R 100 and supplies the read data to the host computer or the like.

The data recording system 10 has an input terminal 11 to which data (user data) from the host computer or the like is supplied. The user data supplied at the input terminal 11 is first supplied to a formatting circuit 12.

The formatting circuit 12 blocks and packetizes user data supplied from the input terminal 11 according to a predetermined format. One data block include for example 2352 bytes of user data, and one packet includes for example 32 data blocks. The packet is a minimum unit of data to be continuously written to the CD-R and data will not be written to the CD-R in any unit smaller than the packet. In case a variable-length packet system, however, the packet length is variable.

The user data blocked and packetized by the formatting circuit 12 is supplied to a linking block appending unit 13.

The linking block appending unit 13 appends a data linking block necessary for linking of data to each packet of the user data supplied from the formatting circuit 12. Also, the linking block appending unit 13 will append the aforementioned mode byte indicating information on the attribute of the data block.

Figure 18:
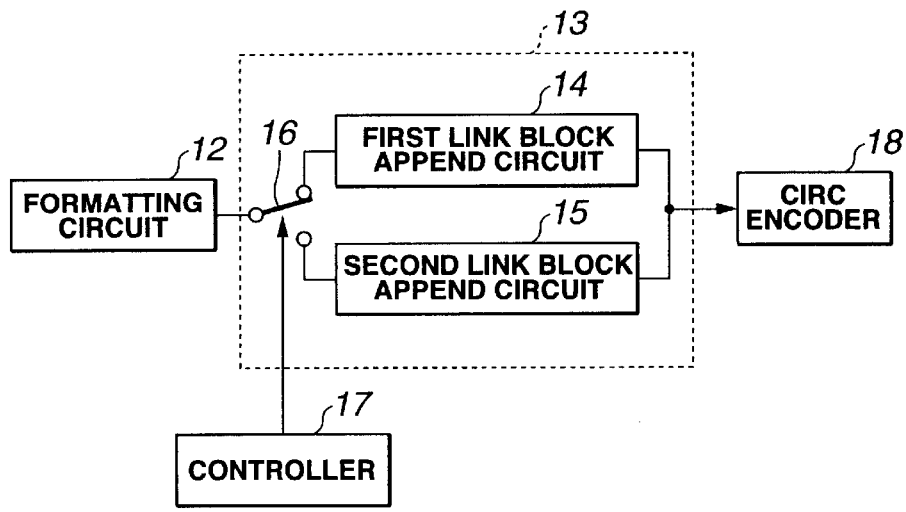
FIG. 18 is a detailed block diagram of a data linking block appending unit of the optical disc drive in FIG. 17.

The linking block appending unit 13 is designed to switch the manner of data linking block appending from one to another depending upon whether data is going to be written to the normal-density CD-R or to the double-density CD-R. As shown in FIG. 18, it includes a first linking block appending circuit 14, second linking block appending circuit 15, and a switching circuit 16 which provides a selection between the first and second linking block appending circuits 14 and 15.

The first and second linking block appending circuits 14 and 15 append data linking blocks necessary for linking of data to each of the packets being data units which are to be continuously written to the CD-R 100. Of them, the first linking block appending circuit 14 is to be selected for data write to the normal-density CD-R, while the second linking block appending circuit 15 is to be selected for data write to the double-density CD-R.

That is to say, when a controller 17 judges that the CD-R 100 to which data is going to be written is the normal-density CD-R, the switching circuit 16 selects the first linking block appending circuit 14 and the formatting circuit 12 supplies the packetized user data to the first linking block appending circuit 14. The first linking block appending circuit 14 appends data linking blocks to each packet of the supplied data. More particularly, the first linking block appending circuit 14 appends a total of seven data linking blocks including one linking block and four run-in blocks for example to the head of each packet while appending two run-out blocks to the tail of each packet. Namely, the first linking block appending circuit 14 will append a total of seven data linking blocks to each of the packets.

On the other hand, when the controller 17 judges that the CD-R 100 to which data is going to be written is the double-density CD-R, the switching circuit 16 selects the second linking block appending circuit 15 and the formatting circuit 12 supplies the packetized user data to the second linking block appending circuit 15. The second linking block appending circuit 15 appends data linking blocks to each packet of the supplied data. More particularly, the second linking block appending circuit 15 appends one linking block and three run-in blocks for example to the head of each packet while appending three run-out blocks to the tail of each packet. Namely, the second linking block appending circuit 15 will append a total of seven data linking blocks to each of the packets.

The data having the data linking blocks to each packet thereof by the first or second linking block appending circuit 14 or 15 is supplied to a CIRC encoder 18.

Figure 19:
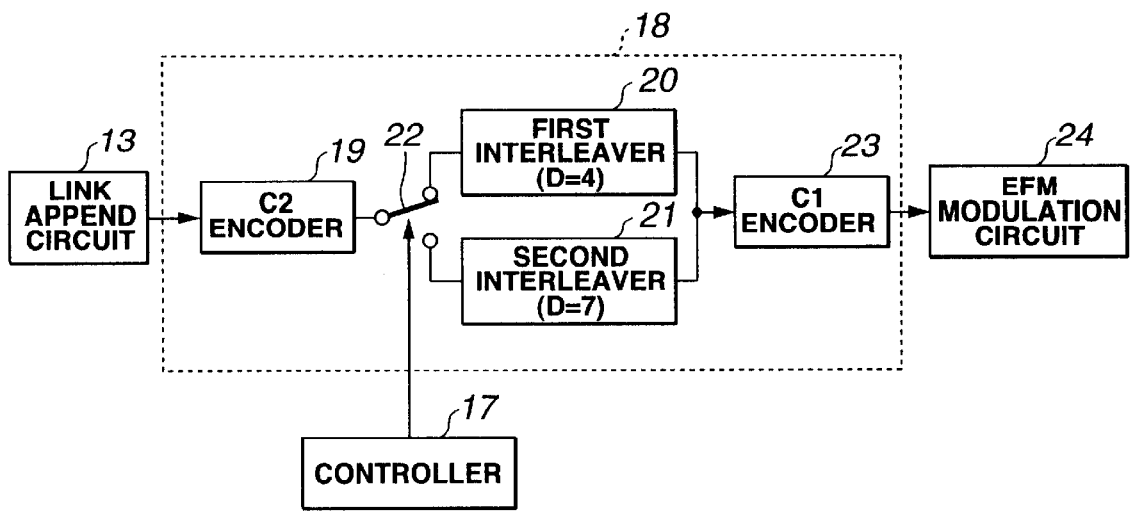
FIG. 19 is a detailed block diagram of a CIRC encoder of the optical disc drive in FIG. 17.

As shown in FIG. 19, the CIRC encoder 18 includes a C2 encoder 19, first and second interleavers 20 and 21, a switching circuit 22 which provides a selection between the first and second interleavers 20 and 21, and a C1 encoder 23.

The data supplied from the first or second linking block appending circuit 14 or 15 is first supplied to the C2 encoder 19. This C2 encoder 19 makes a Reed-Solomon coding (C2 code) of the supplied data at each data unit of 24 bytes (12 words) and appends 4 bytes of parity (Q parity) to the coded data. Thus, a total of 28 bytes of user data and 4-byte parity (Q parity) are supplied to the first and second interleaver 20 or 21 whichever is selected by the switching circuit 22 where the data will be interleaved.

The first interleaver 20 has a delay parameter D of "4" (frames) set therein and will be selected for data write to the normal-density CD-R. That is, when the controller 17 judges that the CD-R 100 to which data is going to be written is the normal-density CD-R, the first interleaver 20 will be selected by the switching circuit 22. When the first interleaver 20 is selected by the switching circuit 22 and supplied with the data having the Q parity appended thereto, it interleaves the data with a maximum delay of 108 frames (27×4 frames) for example.

On the other hand, the second interleaver 21 has a delay parameter D of "7" (frames) set therein, and will be selected for data write to the double-density CD-R. Namely, when the controller 17 judges that the CD-R 100 to which data is going to be written is the double-density CD-R, the second interleaver 21 will be selected by the switching circuit 22. When the second interleaver 21 is selected by the switching circuit 22 and supplied with the data having the Q parity appended thereto, it interleaves the data with a maximum of 189 frames for example (27×7 frames).

The data having thus been interleaved by the first or second interleaver 20 or 21 is supplied to the C1 encoder 23. The C1 encoder 23 makes a Reed-Solomon coding (C1 code) of the data having the Q parity appended thereto at each data unit of 28 bytes and further appends 4 bytes of parity (P parity) to the coded data.

The data thus subjected to the CIRC error correction is supplied to an EFM modulation circuit 24 where it will be subjected to EFM modulation (eight to fourteen modulation). The data thus EFM-modulated is supplied to a write controller 25.

The write controller 25 generates a recording signal corresponding to data going to be written to the CD-R 100 under the control of the controller 17, and supplies the recording signal to an optical pickup 50.

For linking the data, the controller 17 provides a control for a shift of 26 (±4) EFM frames from the leading edge of the subcode sync signal "$S_0, S_1$" and for a shift of −14 to +40 EFM frames from the leading edge of the block sync signal taking in consideration a deviation between the leading edges of the subcode sync signal "$S_0, S_1$" and block sync signal. The write controller 25 generates a recording signal corresponding to the control by the controller 17 and supplies to the optical pickup 50.

Based on the recording signal supplied from the write controller 25, the optical pickup 50 forms, in the recording area of the CD-R 100, a pit (mark) row corresponding to data to be written. Thus, the user data supplied from the host computer or the like will be recorded to the CD-R 100.

In the optical disc drive 1 according to the present invention, the manner of data interleaving by the CIRC encoder 18 is switched from one to another as in the above depending upon whether data is going to be written to the normal-density CD-R or to the double-density CD-R. Namely, the data going to be written to the normal-density CD-R is interleaved by the first interleaver 20 with a delay parameter D of 4 (frames), while the data going to be written to the double-density CD-R is interleaved by the second interleaver 21 with a delay parameter D of 7 (frames). Therefore, the optical disc drive 1 according to the present invention can effect a most suitable interleaving for the conventional normal-density CD-R when data is going to be written to the normal-density CD-R, and can effect such an interleaving as to assure an improved ability of correcting a burst error when data is going to be written to the double-density CD-R.

Further, in the optical disc drive 1 according to the present invention, the manner of data linking block appending by the data linking block appending circuit 13 is switched from one to another depending upon whether data is going to the normal-density CD-R or to the double-density CD-R, to append one linking block, four run-in blocks, and two run-out blocks to data to be written to the normal-density CD-R at each packet of the latter being the continuously written data unit by the first data linking block appending circuit 14 or to append one linking block, three run-in blocks and three run-out blocks to data to be written to the double-density CD-R at each packet of the latter by the second data linking block appending circuit 15. Therefore, the optical disc drive 1 can provide a most suitable data linking for the conventional normal-density CD-R when linking, in the normal-density CD-R, data having been interleaved with a maximum delay of 108 EFM frames. Also, when linking, in the double-density CD-R, data having been interleaved with a maximum delay of 189 EFM frames, the optical disc drive 1 can enable a proper data linking for the double-density CD-R by suppressing the influence of such a large maximum delay.

On the other hand, in the data playback system 30, a signal recorded as a pit (mark) row in the CD-R 100 is read by the optical pickup 50 and supplied to a playback amplifier 31. On the basis of the signal supplied from the optical pickup 50, the playback amplifier 31 produces a read signal (RF signal), focus error signal, tracking error signal, ATIP wobble signal, etc.

The read signal produced by the playback amplifier 31 is converted to digital data by a binarization circuit, clock extraction circuit and the like (not shown), and supplied to an EFM demodulation circuit 32. Also, the focus error signal and tracking error signal produced by the playback amplifier 31 are supplied to a servo controller (not shown). The servo controller will provide focus and tracking servo control of the optical pickup 50 on the basis of these focus and tracking error signals.

The ATIP wobble signal from the playback amplifier 31 is supplied to an ATIP decoder 33. The ATIP wobble signal is originated from the wobbling grooves in the CD-R 100. That is, the CD-R 100 has the wobbling grooves 105 formed along the recording track thereof, and owing to the wobbling of the wobbling grooves 105, FM-modulated positional information, namely, time-base information indicating an absolute position on the optical disc, etc. are recorded as ATIP wobble signals are recorded as the ATIP wobbling signal. The ATIP wobble signal is decoded by an ATIP decoder 33 to provide ATIP information based on which an absolute position on the CD-R 100 where no recording has been made can be detected.

Also in the optical disc drive 1 according to the present invention, it is detected from a pattern of a sync signal of the ATIP information indicative of which type the CD-R 100 to and/or from which data is going to be written to and/or read is, the normal-density CD-R or double-density CD-R, which will further be described later.

The digital data (read signal) supplied to the EFM demodulation circuit 32 is EFM-modulated there and then supplied to a CIRC decoder 34.

Figure 20:
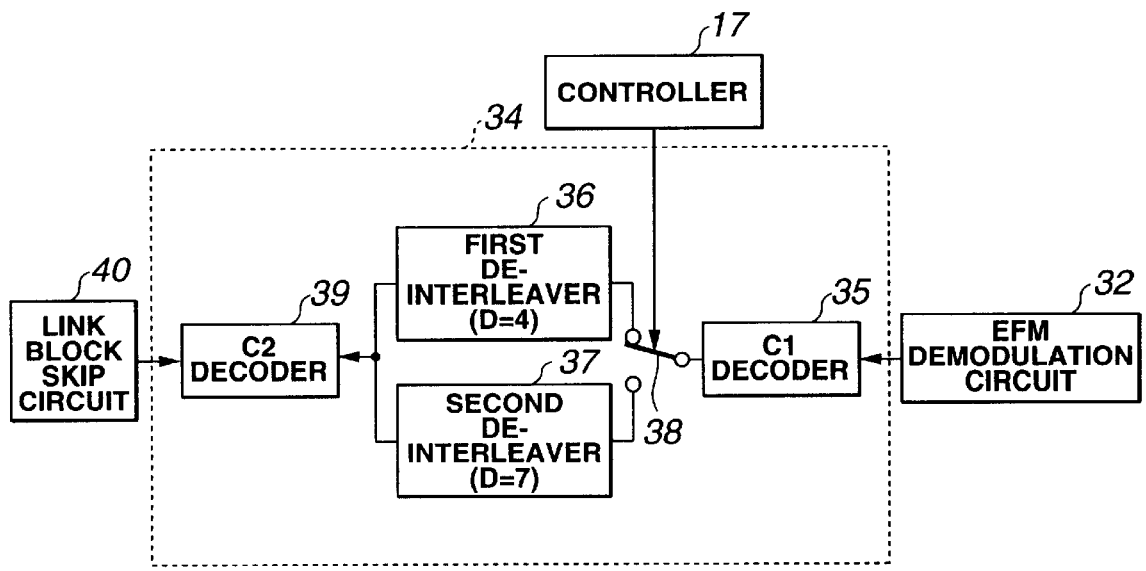
FIG. 20 is a detailed block diagram of a CIRC decoder of the optical disc drive in FIG. 17.

As shown in FIG. 20, the CIRC decoder 34 includes a C1 decoder 35, first and second de-interleavers 36 and 37, switching circuit 38 which provides a selection between the first and second de-interleavers 36 and 37, and a C2 decoder 39.

The read data from the EFM demodulation circuit 32 is first supplied to the C1 decoder 35 where it is subjected to error correction with C1 code. Mainly random errors being small errors will be corrected by the C1 code error correction. The read data having been error-corrected with the C1 code by the C1 decoder 35 is supplied to the first or second de-interleaver 36 or 37 whichever is selected by the switching circuit 38.

In the first de-interleaver 36, the delay parameter D is set to "4". The first de-interleaver 36 corresponds to the first interleaver 20 in the CIRC encoder 18. That is, when the controller 17 judges that the CD-R 100 from which data is going to be read is the normal-density CD-R, the switching circuit 38 will select the first de-interleaver 36. The latter will de-interleave the read data having been interleaved by the first interleaver 20 in the CIRC encoder 18, written to the normal-density CD-R and read from the latter.

In the second de-interleaver 37, the delay parameter D is set to "7". The second de-interleaver 37 corresponds to the second interleaver 21 in the CIRC encoder 18. That is, when the controller 17 judges that the CD-R 100 from which data is going to be read is the double-density CD-R, the switching circuit 38 will select the second de-interleaver 37. When supplied with the read data having been interleaved by the second interleaver 21 in the CIRC encoder 18, written to the double-density CD-R and read from the latter, the second de-interleaver 37 will de-interleave the data.

The read data having been de-interleaved by the first or second de-interleaver 36 or 37 is supplied to the C2 decoder 39 where it will be subjected to error correction with C2 code. Mainly burst errors being large errors will be corrected by the C2 code error correction. The read data having been error-corrected with the C2 code by the C2 decoder 39 is supplied to a linking block skipping circuit 40.

Figure 21:
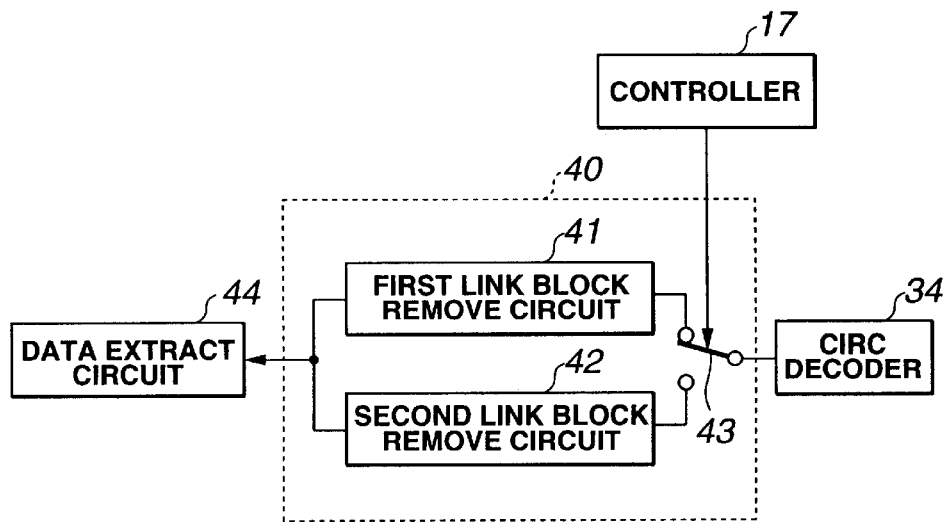
FIG. 21 is a detailed block diagram of a data linking block skipping unit of the optical disc in FIG. 17.

As shown in FIG. 21, the linking block skipping circuit 40 includes first and second data linking block removing circuits 41 and 42, and a switching circuit 43 which provides a selection between the first and second data linking block removing circuits 41 and 42.

The first data linking block removing circuit 41 corresponds to the first data linking block appending circuit 14 in the data linking block appending unit 13. When the controller 17 judges that the CD-R 100 from which data is going to be read is the normal-density CD-R, the switching circuit 43 will select the first data linking block removing circuit 41. When supplied with the read data having the data linking blocks appended thereto by the first data linking block appending circuit 14 in the data linking block appending unit 13, written to the normal-density CD-R and read from the latter, the first data block removing circuit 41 will remove the one linking block and four run-in blocks appended to the head of each packet of the data and the two run-out blocks appended to the tail of the packet.

On the other hand, the second data linking block removing circuit 42 corresponds to the second data linking block appending circuit 15 in the data linking block appending unit 13. When the controller 17 judges that the CD-R 100 from which data is going to be read is the double-density CD-R, the switching circuit 43 will select the second data linking block removing circuit 42. When supplied with the read data having been appended the data linking blocks appended by the second data linking block appending circuit 15 in the data linking block appending unit 13, written to the double-density CD-R and read from the latter, the second data block removing circuit 42 will remove the one linking block and three run-in blocks appended to the head of each packet of the data and the three run-out blocks appended to the tail of the packet.

The read data having the data linking blocks thus removed from each packet by the first or second data linking block removing circuit 41 or 42 is supplied to a data extraction circuit 44. The user data extracted by the data extraction circuit 44 is delivered at an output terminal 45 to the host-computer or the like.

Figure 22:
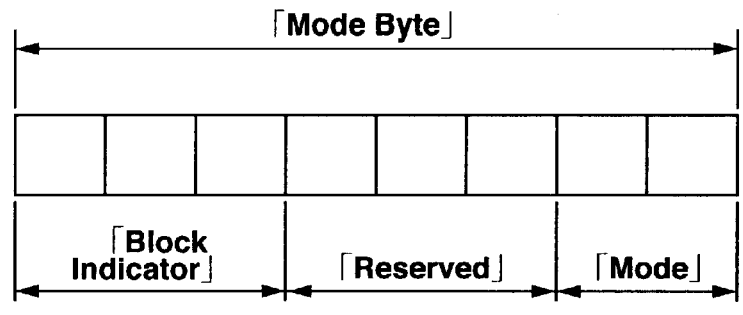
FIG. 22 shows the content of a mode byte in a block header of a data block.

When removing the data linking blocks by the first or second data block linking removing circuit 41 or 42 in the data linking block skipping circuit 40, reference is made to the mode byte in a "block header" in each data block. As shown in FIG. 22, the mode byte is of 1 byte (8 bits) of which the first 3 bits are assigned as a block indicator indicative of the attribute of the data block, next 3 bits are reserved and last 2 bits are assigned as "mode" indicative of a recording mode in which the data block is recorded. By making reference to the block indicator in the mode byte, it is possible to detect which the data block is, a user data block or data linking block and which of the data linking blocks the data block is.

In a data written to the double-density CD-R, when the block indicator being the first three bits of the mode byte is "000", the data block is a user data block. When the block indicator is "001", the data block is the third run-in block. When the block indicator is "010", the data block is the second run-in block. When the block indicator is "011", the data block is the first run-in block. Also, in a data written to the double-density CD-R, when the block indicator being the first three bits of the mode byte is "100", the data block is a data linking block. When the block indicator is "101", the data block is the third run-out block. When the block indicator is "110", the data block is the second run-out block. When the block indicator is "111", the data block is the first run-out block.

As in the above, the mode byte in the block header in each data block includes the attribute of the data block. By referencing to the block indicator when removing the data linking blocks, the attributes of the data blocks can be discriminated and only the data linking blocks can properly be removed.

Note that as shown in FIG. 22, the block indicators of the data linking blocks written to the double-density CD-R are numbered "111", "110", "101", . . . , "001" in the order of being read from the third run-out block to the third run-in block. Therefore, by making reference to the continuity of the block indicators, the data linking blocks can be detected with an extremely high accuracy.

In the data playback system 30 of the optical disc drive 1 according to the present invention, the two de-interleavers 36 and 37 are provided correspondingly to the two interleavers 20 and 21 and two data linking block removing circuits 41 and 42 are provided correspondingly to the two data linking block appending circuits 14 and 15. One of them is selected depending upon whether the CD-R 100 from which data is going to be read is the normal-density CD-R or double-density CD-R. Therefore, the data playback system 30 of the optical disc drive 1 can properly read data having been written by the data recording system 10 to the normal-density CD-R and double-density CD-R.

Note that in the optical disc drive 1, operation of each component is controlled by the controller 17. For example, the normal-density CD-R and double-density CD-R is rotated by a spindle motor (not shown). When writing or reading data to or from the normal-density CD-R, this spindle motor is controlled by the controller 17 to rotate at a CLV (constant linear velocity) of 1.2 m/sec, and when writing or reading data to or from the double-density CD-R, the spindle motor is controlled by the controller 17 to rotate at a CLV of 0.9 m/sec.

Also the optical pickup 50 is controlled by the controller 17. For example, the aforementioned focus servo control and tracking servo control are effected by the optical pickup 50 under the control of the controller 17. Further, the laser power is controlled by the controller 17. Moreover, access of the optical pickup 50 to a predetermined recording track is controlled by the controller 17. Such an access of the optical pickup 50 will properly be done based on an ATIP information etc. provided by decoding the aforementioned ATIP wobble signal by the ATIP decoder 33 by controlling a sled motor etc. by means of the controller 17.

Furthermore, the controller 17 controls the aforementioned switching operations of the switching circuit 16 in the data linking block appending unit 13, switching circuit 22 in the CIRC encoder 18, switching circuit 38 in the CIRC decoder 34 and switching circuit 43 in the data linking skipping circuit 40, respectively. More particularly, the controller 17 judges, for example, based on a pattern of a sync signal of the ATIP information provided by decoding the ATIP wobble signal by the ATIP decoder 33, whether the CD-R 100 to or from which data is going to be written or read is the normal- or double-density CD-R, and switches, based on the judgment, the switching operations, from one to another, of the switching circuit 16 in the data linking block appending unit 13, switching circuit 22 in the CIRC encoder 18, switching circuit 38 in the CIRC decoder 34 and switching circuit 43 in the data linking skipping circuit 40, respectively.

Figure 23:
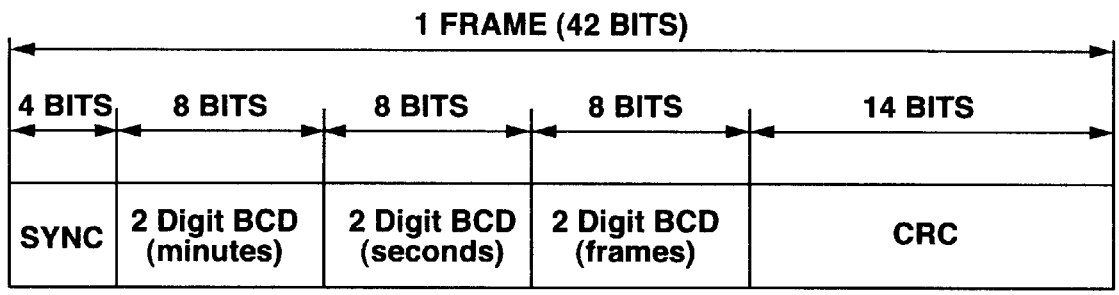
FIG. 23 shows a frame structure of an ATIP wobble signal.

The ATIP information will further be described herebelow. The frame of the ATIP information is organized as shown in FIG. 23. As shown, one frame of the ATIP information is of 42 bits of which the first 4 bits are assigned to a sync signal "SYNC", next 32 bits are assigned to tine-base information "minutes", "seconds" and "frames" each of 2-digit BCDs (8 bits), and the remaining 14 bits are assigned to CRC (cyclic redundancy code). In the CD-R 100, the patterns of the sync signal "SYNC" of the ATIP information for the normal-density CD-R and double-density CD-R, respectively, are different from each other.

An example of the pattern of the sync signal "SYNC" of the ATIP information for the normal-density CD-R is shown in detail in FIGS. 24A to 24E.

Figure 24A:
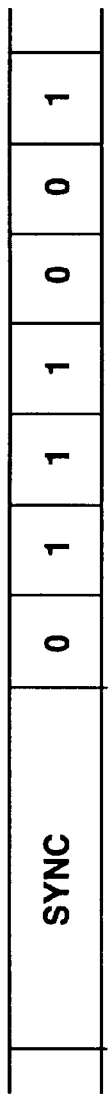
FIG. 24A shows the ATIP information.
Figure 24B:
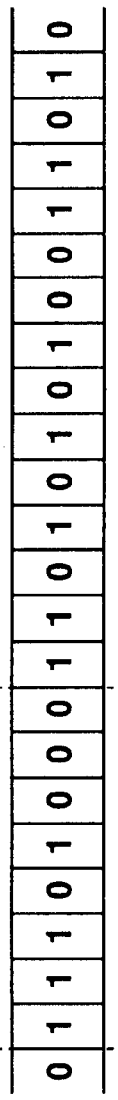
FIG. 24B shows a channel bit pattern which will be when a preceding channel bit is "0"
Figure 24C:
FIG. 24C shows a biphase signal corresponding to the channel bit pattern in FIG. 24B.
Figure 24D:
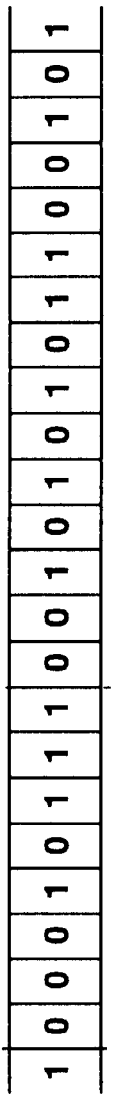
FIG. 24D shows a channel bit pattern which will be when the preceding channel bit is "1"
Figure 24E:
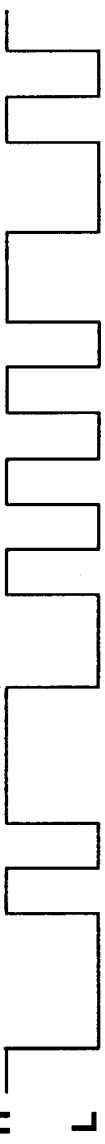
FIG. 24E shows a biphase signal corresponding to the channel bit pattern in FIG.

The ATIP information shown in FIG. 24A is biphase mark modulated to have a channel bit pattern shown in FIG. 24B or 24D. When a preceding channel bit is "0", the sync signal "SYNC" of the ATIP information has a channel bit pattern "11101000" as shown in FIG. 24B, and the biphase signal having been subjected to the biphase mark modulation shows a waveform as shown in FIG. 24C. When the preceding channel bit is "1", the sync signal "SYNC" of the ATIP information has a channel bit pattern "00010111" as shown in FIG. 24D, and the biphase signal having been subjected to the biphase mark modulation shows a waveform as shown in FIG. 24E. Namely, the sync signal "SYNC" of the ATIP information for the normal-density CDR has a pattern in which a 3T waveform and another 3T waveform of an opposite polarity to that of the former are connected via 1T waveforms as will be seen from FIG. 24E.

An example of the pattern of the sync signal "SYNC" of the ATIP information for the double-density CD-R is shown in detail in FIGS. 25A to 25E.

Figure 25A:
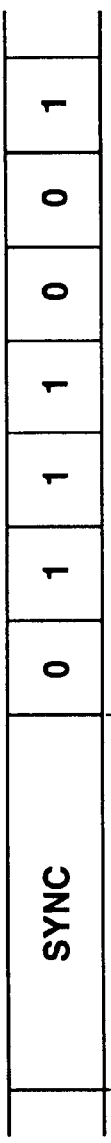
FIG. 25A shows the ATIP information.
Figure 25B:
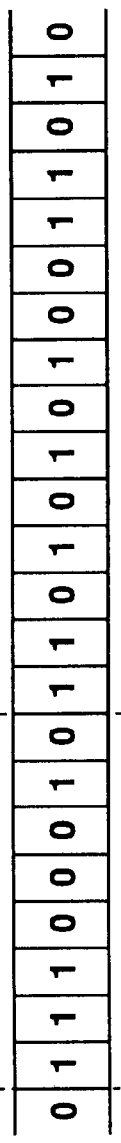
FIG. 25B shows a channel bit pattern which will be when a preceding channel bit is "0"
Figure 25C:
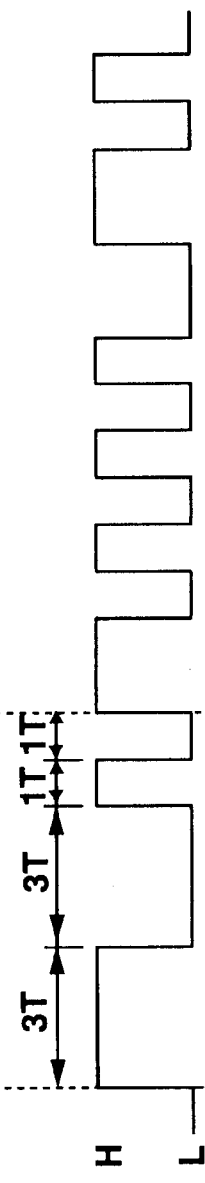
FIG. 25C shows a biphase signal corresponding to the channel bit pattern in FIG. 25B.
Figure 25D:
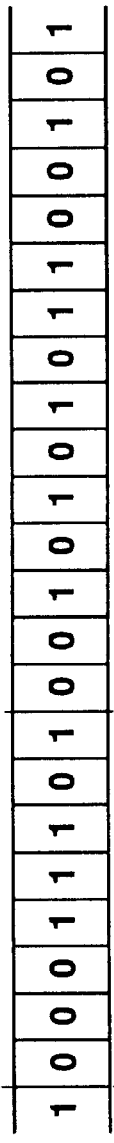
FIG. 25D shows a channel bit pattern which will be when the preceding channel bit is "1"
Figure 25E:
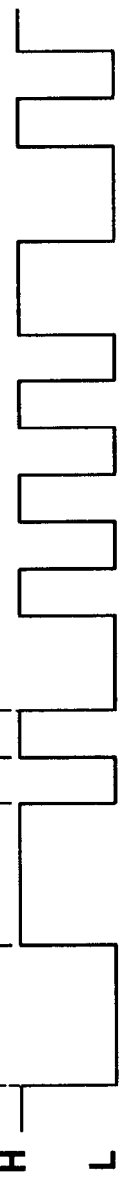
FIG. 25E shows a biphase signal corresponding to the channel bit pattern in FIG. 25D.

The ATIP information shown in FIG. 25A is biphase mark modulated to have a channel bit pattern shown in FIG. 25B or 25D. When a preceding channel bit is "0", the sync signal "SYNC" of the ATIP information has a channel bit pattern "1100010" as shown in FIG. 25B, and the biphase signal having been subjected to the biphase mark modulation shows a waveform as shown in FIG. 25C. When the preceding channel bit is "1", the sync signal "SYNC" of the ATIP information has a channel bit pattern "00011101" as shown in FIG. 25D, and the biphase signal having been subjected to the biphase mark modulation shows a waveform as shown in FIG. 25E. Namely, the sync signal "SYNC" of the ATIP information for the double-density CDR has a pattern in which a 3T waveform and another 3T waveform of an opposite are continuous with each other as will be seen from FIG. 25E.

In the CD-R 100, since the pattern of the sync signal "SYNC" of the ATIP information is varied depending upon whether the CD-R 100 is the normal-density CD-R or double-density CD-R as in the above, the controller 17 can judge based on the sync signal of the ATIP information whether the CD-R 100 to or from which data is going to be written or read is the normal-density CD-R or double-density CD-R.

When the controller 17 judges that the CD-R 100 to which data is going to be written is the normal-density CD-R, it will allow the switching circuit 16 in the data linking block appending unit 13 to select the first data linking block appending circuit 14, the latter to append data linking blocks including one linking block, four run-in blocks and two run-out blocks to each packet of the data, the switching circuit 22 in the CIRC encoder 18 to select the first interleaver 20, and the latter to interleave the data with a delay parameter D of 4.

On the other hand, when the controller 17 judges that the CD-R 100 to which data is going to be written is the double-density CD-R, it will allow the switching circuit 16 in the data linking block appending unit 13 to select the second data linking block appending circuit 15, the latter to append data linking blocks including one linking block, three run-in blocks and three run-out blocks to each packet of the data, the switching circuit 22 in the CIRC encoder 18 to select the second interleaver 21, and the latter to interleave the data with a delay parameter D of 7.

Also, when the controller 17 judges that the CD-R 100 from which data is going to be read is the normal-density CD-R, it will allow the switching circuit 38 in the CIRC decoder 34 to select the first de-interleaver 36, the latter to de-interleave the data, the switching circuit 43 in the data linking block skipping circuit 40 to select the first data linking block removing circuit 41, and the latter to remove the data linking blocks.

On the other hand, when the controller 17 judges that the CD-R 100 from which data is going to be read is the double-density CD-R, it will allow the switching circuit 38 in the CIRC decoder 34 to select the second de-interleaver 37, the latter to de-interleave the data, the switching circuit 43 in the data linking block skipping circuit 40 to select the second data linking block removing circuit 42, and the latter to remove the data linking blocks.

As in the above, in the optical disc drive 1 according to the present invention, the controller 17 judges based on the pattern of the sync signal "SYNC" of the ATIP information whether the CD-R100 to or from which data is going to be written or read is the normal-density CD-R or double-density CD-R, and controls based on the judgment the operations of the switching circuit 16 in the data linking block appending unit 13, switching circuit 22 in the CIRC encoder 18, switching circuit 38 in he CIRC decoder 34 and the switching circuit 43 in the data linking block removing unit 40. Thus, no special discriminating mechanism has to be provided as in a mechanical discrimination of the CD-R 100 for example. Since the CD-R 100 can be discriminated properly and quickly, most suitable data writing and reading can be done to and from both the normal-density CD-R and double-density CD-R. Especially, the discrimination of the CD-R 100 based on the pattern of the sync signal "SYNC" of the ATIP information being a signal detected from the wobbling grooves 105 permits to properly discriminate the CD-R 100 even when data is going to be written to the CD-R 100 in which no data has yet been written.

Note that the method of discriminating an optical disc is not limited to the aforementioned embodiment but at the time of data reading for example, the CD-R 100 may be discriminated based on a difference in frame sync signal between data having been read from the CD-R 100 and supplied to the CIRC decoder 34.

In the foregoing, there has been described an example in which seven data linking blocks including one linking block, three run-in blocks and three run-out blocks are appended to each packet of data going to the written to the double-density CD-R, that is, data which will be interleaved with a maximum delay of 189 EFM frames. However, it should be noted that depending upon the performance of the optical disc drive, eight data linking blocks including one linking block, four run-in blocks and three run-out blocks may be appended to each packet of data being going to be written to the double-density CD-R. In this case, the data linking blocks being meaningless as user data is increased in number while the capacity for recordable user data is somewhat decreased but re-synchronization at the time of data read after the data write is restarted can positively be made irrespectively of the performance of the optical disc drive.

Note that when the total number of data linking blocks is eight, the content of the block indicator in the mode byte shown in FIG. 22 has to be changed. In this case, since it is highly possible that the data linking blocks and adjacent data blocks will be destroyed due to the data interleaving and cannot be read, the number of bits of the block indicator has not to be increased by assigning a total number of data linking blocks as many as the block indicators in the linking block.

For example, "000" is assigned to user data block, "001" is to the fourth run-in block, "010" is to the third run-in block, and "011" is assigned to the second run-in block. "100" is assigned to each of the first run-in block and linking block. Also, "101" is assigned to the third run-out block, "110" is to the second run-out block and "111" is assigned to the first run-out block. With a block indicator being thus determined for each of the total of eight data linking blocks, the data linking blocks can be detected with an extremely high accuracy by making reference to the continuity of the block indicators.

Also, the present invention has been described in the foregoing concerning an example in which data is written to a CD-R which is a recordable optical disc. However, the present invention is applicable for writing data to a CD-RW which is a rewritable optical disc. Namely, an optical disc drive constructed similarly to the optical disc drive having been described in the foregoing can support the CD-RW which is a rewritable optical disc. Generally, the CD-RW is lower in reflectance than the CD-R. So, by additionally providing an AGC (automatic gain controller) which can amplify even a weak signal, the optical disc drive can support the CD-RW perfectly.

As having been described in the foregoing, the present invention permits to effect data linking block appending and error-correction coding properly correspondingly to the recording density of an optical disc to which data is going to be written. Thus, data error correction and data linking can properly be done in the conventional optical disc, and also data linking can properly be done also in an optical disc having an increased recording density by preventing the ability of burst error correction from being lower.

What is claimed is:

1. A data recording apparatus for recording data to one of a first optical disc and a second optical disc having a higher recording density than the first optical disc, the apparatus comprising:

means for appending a plurality of data linking blocks to each unit of data to be continuously written to the optical disc;

means for error-correction coding and interleaving of the data in the data unit having the data linking blocks appended thereto by the means for appending;

means for continuously writing the data having been subjected to the error-correction coding by the means for error-correction coding to the optical disc at each unit of data having the plurality of data linking blocks appended thereto by the means for appending; and an optical disc discriminator for judging whether the data is to be written by the data writing means to the first optical disc or the second disc having a higher recording density than the first optical disc, wherein when the optical disc discriminator judges that the data is to be written by the data writing means to the first optical disc, the means for appending appends a plurality of data linking blocks, including two run-out blocks, to each unit of data to be continuously written to the first optical disc, and the error-correction coding means interleaves the data with a unit delay of four frames, and when the optical disc discriminator judges that the data is to be written by the data writing means to the second optical disc having the higher recording density than the first optical disc, the means for appending appends a plurality of data linking blocks, including three run-out blocks, to each unit of data to be continuously written to the second optical disc, and the error-correction coding means interleaves the data with a unit delay of seven frames.

2. The data recording apparatus as set forth in claim 1, wherein the means for appending appends a plurality of data linking blocks including one linking block and three run-in blocks to each unit of data to be continuously written to the first optical disc.

3. The data recording apparatus as set forth in claim 1, wherein the first optical disc and the second optical disc having the higher recording density than the first optical disc have wobbling grooves formed thereon correspondingly to positional information; and the optical disc discriminator reads the positional information from the wobbling grooves to detect a sync pattern for use by the optical disc discriminator in judging whether the optical disc to which data is to be written by the data writing means is the first optical disc or the second optical disc having the higher recording density than the first optical disc.

4. A data recording apparatus for recording data to one of a first optical disc defined under a first standard and a second optical disc defined under a second standard, the apparatus comprising:

means for appending a plurality of data linking blocks to each unit of data to be continuously written to one of the first and second optical discs;

means for error-correction coding and interleaving the data in the data unit having the data linking blocks appended thereto by the means for appending;

means for continuously writing the data having been subjected to the error-correction coding by the means for error-correction coding to the optical disc at each unit of data having the plurality of data linking bocks appended thereto by the means for appending; and an optical disc discriminator for judging whether the data is to be written by the data writing means to the first or the second optical disc, wherein when the optical disc discriminator judges that data is to be written by the data writing means to the first optical disc, the means for error-correction coding interleaves the data with a unit delay of a first number of frames, and when the optical disc discriminator judges that data is going to be written by the data writing means to the second optical disc, the means for error-correction coding interleaves the data with a unit delay of a second number of frames larger than the first number of frames.

5. The data recording apparatus as set forth in claim 4, wherein the first number of frames is four frames and the second number of frames is seven frames.

6. The data recording apparatus as set forth in claim 4, wherein when the optical disc discriminator judges that the data is to be written to the first optical disc, the means for appending appends a plurality of data linking blocks, including two run-out blocks, to each unit of data to be continuously written to the first optical disc and when the optical disc discriminator judges that the data is to be written to the second optical disc, the means for appending appends a plurality of data linking blocks, including three run-out blocks, to each unit of data to be continuously to be written to the optical disc.

7. The data recording apparatus as set forth in claim 6, wherein the means for appending appends a plurality of data linking blocks including one linking block and three run-in blocks to each unit of data to be written to the first optical disc.

8. The data recording apparatus as set forth in claim 4, wherein the first and second optical discs have wobbling grooves formed thereon correspondingly to positional information; and the optical disc discriminator reads the positional information from the wobbling grooves to detect a sync pattern for use by the optical disc discriminator in judging whether the optical disc to which data is to be written by the data writing means is the first or second optical disc.

9. A data recording method for recording data to one a first optical disc and a second optical disc having a higher recording density than the first optical disc, the method comprising:

a first step at which it is judged whether the data is to be written to the first optical disc or the second optical disc having a higher recording density than the first optical disc;

a second step at which a plurality of data linking blocks is appended to each unit of data to be continuously written to one of the first optical disc and the second optical disc;

a third step at which error-correction coding, including interleaving, is performed on the data having the data linking blocks appended thereto; and a fourth step at which the data having been subjected to the error-correction coding at the third step is continuously written to one of the optical disc and the second optical disc at each unit of data having the plurality of data linking bocks appended thereto at the second step, wherein when it is judged at the first step that data is to be written to the first optical disc, the data is interleaved at the third step with a unit delay of a first number of frames, and when it is judged at the first step that data is to be written to the second optical disc having the higher recording density than the first optical disc, the data is interleaved at the third step with a unit delay of a second number of frames different then the first number.

10. The data recording method as set forth in claim 9, wherein the first number of frames is four frames and the second number of frames is seven frames.

11. The data recording method as set forth in claim 9, wherein it is judged at the first step that data is to be written to the first optical disc, a plurality of data linking blocks including two run-out blocks is appended at the second step to each unit of data to be continuously written to the optical disc, and when it is judged that data is going to be written to the second optical disc having the higher recording density than the first optical disc, a plurality of data linking blocks including three run-out blocks is appended at the second step to each unit of data to be continuously written to the second optical disc.

12. The data recording method as set forth in claim 11, wherein at the second step, a plurality of data linking blocks including one linking block and three run-in blocks is appended to each unit of data to be continuously written to the first optical disc.

13. The data recording method as set forth in claim 9, wherein the first optical disc and the second optical disc having the higher recording density than first optical disc have wobbling grooves formed thereon correspondingly to positional information; and at the first step, it is judged based on a sync pattern detected by reading the positional information from the wobbling grooves whether the optical disc to which data is to be written by the data writing means is the first optical disc or the second optical disc having the higher recording density than the first optical disc.

14. A data reproducing apparatus for reading data from one of a first optical disc defined under a first standard and a second optical disc defined under a second standard, the apparatus including:

an optical head for emitting a laser light to an optical disc and for detecting a reflected light containing data from the optical disc;

an optical disc discriminator for judging whether the data read by the optical head is from the first optical disc or second optical disc;

means for error correction and de-interleaving of the data read by the optical head; and means supplied with the data having been error corrected by the means for error correction for removing a plurality of data linking blocks that were appended for data linking to each unit of the data that was continuously written to the first and second optical discs; wherein when the optical disc discriminator judges that the data is read by the optical head from the first optical disc, the means supplied with the data removes the plurality of data linking blocks, including two run-out blocks, from each unit of data that was continuously written to the first optical disc, and when the optical disc discriminator judges that data is read from the second optical disc, the means supplied with the data removes the plurality of data linking blocks, including three run-out blocks, from each unit of data that was continuously written to the second optical disc.

15. The data reproducing apparatus as set forth in claim 14, wherein the means supplied with the data removes the plurality of data linking blocks, including one linking block and three run-in blocks, from each unit of data that was written to the first optical disc.

16. The data reproducing apparatus as set forth in claim 14, wherein the first and second optical discs have wobbling grooves formed thereon correspondingly to positional information; and the optical disc discriminator judges, based on a sync pattern detected by reading the positional information from the wobbling grooves, whether the data is read from the first or second optical disc.

17. The data reproducing apparatus as set forth in claim 14, wherein when the optical disc discriminator judges that data has been read by the optical head from the first optical disc, the means for error correction performs a first de-interleaving of the data having been read by the optical head; and when the optical disc discriminator judges that the data has been read by the optical head from the second optical disc, the means for error correction performs a second de-interleaving, different from the first de-interleaving, of the data having been read by the optical head.

18. A data reproducing apparatus for reading data from a first optical disc defined under a first standard and from a second optical disc defined under a second standard, the apparatus including:

an optical head for emitting a laser light to an optical disc and detecting a reflected light containing data from the optical disc;

an optical disc discriminator for judging whether the data read by the optical head is from the first optical disc or second optical disc;

means for error correction, including de-interleaving, of the data read by the optical head; and means supplied with the data having been error corrected by the means for error correction for removing a plurality of data linking blocks that were appended, for data linking, to each unit of the data that was continuously written to the first and second optical discs, wherein when the optical disc discriminator judges that the data has been read by the optical head from the first optical disc, the means for error correction de-interleaves, with a first unit delay, the data read by the optical head, and when the optical disc discriminator judges that data has been read from the second optical disc, the means for error correction de-interleaves, with a second unit delay larger than the first unit delay, the data read by the optical head.

19. The data reproducing apparatus as set forth in claim 18, wherein the first unit delay is four frames and the second unit delay is seven frames.

20. The data reproducing apparatus as set forth in claim 18, wherein when the optical disc discriminator judges that the data has been read by the optical head from the first optical disc, the means supplied with the data removes a plurality of data linking blocks including two run-out blocks from each data that was continuously written to the first optical disc, and when the optical disc discriminator judges that data has been read by the optical head from the second optical disc, the means supplied with the data removes a plurality of data linking blocks, including three run-out blocks, from each data that was continuously written to the second optical disc.

21. The data reproducing apparatus as set forth in claim 20, wherein the means supplied with the data removes a plurality of data linking blocks, including one linking block and three run-in blocks, from each data that was continuously written to the first optical disc.

22. The data reproducing apparatus as set forth in claim 18, wherein the first and second optical discs have wobbling grooves formed thereon correspondingly to positional information; and the optical disc discriminator judges, based on a sync pattern detected by reading the positional information from the wobbling grooves, whether the data is read from the first or second optical disc.

23. A data reproducing method for reading data from a first optical disc defined under a first standard and from a second optical disc defined under a second standard, the method including:

a first step at which a light beam is emitted to an optical disc and a return light beam containing data from the optical disc is detected;

a second step at which it is judged whether the light beam has been returned from the first optical disc or second optical disc;

a third step at which error correction, including de-interleaving, is performed on the data read from one of the first optical disc and the second optical disc; and a fourth step at which there is removed a plurality of data linking blocks having been appended, for data linking, at each unit of the data having been error corrected at the third step and that was continuously written to one of the first and second optical discs, wherein when it is judged at the second step that the data is read from the first optical disc, the data is de-interleaved with a first unit delay at the third step, and when it is judged at the second step that the data is read from the second optical disc, the data is de-interleaved at the third step with a second unit delay larger than the first unit delay.

24. The data reproducing method as set forth in claim 23, wherein the first unit delay is four frames and the second unit delay is seven frames.

25. The data reproducing method as set forth in claim 23, wherein when it has been judged at the second step that data has been read from the first optical disc, a plurality of data linking blocks including two run-out blocks is removed at the fourth step from each unit of data that was continuously written to the first optical disc; and when it has been judged at the second step that data has been read from the second optical disc, a plurality of data linking blocks including three run-out blocks is removed at the fourth step from each unit of data that was continuously written to the second optical disc.

26. The data reproducing method as set forth in claim 25, wherein at the fourth step a plurality of data linking blocks including one linking block and three run-in blocks is removed from each unit of data that was continuously been written to the first optical disc.

27. The data reproducing method as set forth in claim 23, wherein the first and second optical discs have wobbling grooves formed thereon correspondingly to positional information; and at the second step, it is judged, based on a sync pattern detected by reading the positional information from the wobbling grooves, whether the data is to be read from the first or second optical disc.

28. An optical disc having data recorded therein by a method for recording data in one of a first optical disc format or to a record optical disc format having a higher recording density, the method comprising:

a first step at which it is judged whether the data is to be written in the first optical disc format or the second optical disc format having a higher recording density the first optical disc format;

a second step at which a plurality of data linking blocks is appended to each unit of data to be continuously written in one of the first optical disc format and the second optical disc format;

a third step at which error-correction coding, including interleaving, is performed on each unit of the data having the data linking blocks appended thereto; and a fourth step at which the data having been subjected to the error-correction coding at the third step is continuously written in one of the first optical disc format and the second optical disc format at each unit of data having the plurality of data linking bocks appended thereto at the second step, wherein when it is judged at the first step that data is to be written in the first optical disc format, a plurality of data linking blocks, including two run-out blocks, are appended at the second step to each unit of data to be continuously written in the first optical disc format and the data having the data linking blocks appended thereto is interleaved with a unit delay of four frames at the third step; and when it is judged at the first step that data is to be written in the second optical disc format, a plurality of data linking blocks, including three run-in blocks, are appended at the second step to each unit of data to be continuously written in the second optical disc format and the data having the data linking blocks appended thereto is interleaved with a unit delay of seven frames at the third step.

29. The optical disc as set forth in claim 28, wherein at the second step, a plurality of data linking blocks including one linking block and three run-in blocks is appended to each unit of data to be continuously written in the first optical disc format.

30. The optical disc as set forth in claim 28, further comprising wobbling grooves formed thereon correspondingly to positional information.

31. An optical disc having data continuously recorded therein, with each unit of data having appended thereto a plurality of data linking blocks including three run-out blocks and obtained by appending to the plurality of data linking blocks continuously written thereon, error-correction coding, including an interleaving with a unit delay of seven frames, the data having the plurality of data linking blocks appended thereto, and continuously recording of the data having been subjected to the error-correction coding.

32. The optical disc as set forth in claim 31, wherein the plurality of data linking blocks including one linking block and three run-in blocks at each unit of data continuously written thereon.

33. The optical disc as set forth in claim 31, having wobbling grooves formed thereon correspondingly to positional information on the optical disc.

* * * * *